US012046791B2

(12) United States Patent
Girard et al.

(10) Patent No.: US 12,046,791 B2
(45) Date of Patent: Jul. 23, 2024

(54) ANTENNA FEED FOR A DIRECT RADIATING ARRAY ANTENNA, RADIATING PANEL AND ANTENNA COMPRISING SEVERAL ANTENNA FEEDS

(71) Applicant: THALES, Courbevoie (FR)

(72) Inventors: Thierry Girard, Toulouse (FR); Maïder Etcharren, Toulouse (FR); Alexandre Cot, Toulouse (FR)

(73) Assignee: THALES, Courbevoie (FR)

( * ) Notice: Subject to any disclaimer, the term of this patent is extended or adjusted under 35 U.S.C. 154(b) by 270 days.

(21) Appl. No.: 17/545,923

(22) Filed: Dec. 8, 2021

(65) Prior Publication Data

US 2022/0190477 A1 Jun. 16, 2022

(30) Foreign Application Priority Data

Dec. 10, 2020 (FR) ...................................... 2012951

(51) Int. Cl.
*H01P 1/207* (2006.01)
*H01P 1/17* (2006.01)
(Continued)

(52) U.S. Cl.
CPC .............. *H01P 1/207* (2013.01); *H01P 1/171* (2013.01); *H01Q 13/06* (2013.01); *H01Q 21/064* (2013.01)

(58) Field of Classification Search
CPC .......... H01P 1/207; H01P 1/171; H01P 1/173; H01P 5/107; H01P 3/123; H01Q 13/06; H01Q 21/064
See application file for complete search history.

(56) References Cited

U.S. PATENT DOCUMENTS 6,437,753 B2 * 8/2002 Yuanzhu ................ H01Q 13/24 343/783

FOREIGN PATENT DOCUMENTS

CH 668507 A5 * 12/1988
DE 34 45 399 A1 6/1986
(Continued)

*Primary Examiner* — Andrea Lindgren Baltzell
*Assistant Examiner* — Kimberly E Glenn
(74) *Attorney, Agent, or Firm* — BakerHostetler

(57) ABSTRACT

An antenna feed includes a waveguide having a main part in hollow straight cylinder form extending in a direction, a radiating element, comprising ridges extending inwards and several treads along the direction, the number, the heights and the thicknesses of the treads being configured to allow a variation of impedance of the radiating element, a polarizer comprising two inputs separated by an internal leaf extending in the direction, and an output corresponding to the input of the radiating element, the internal leaf comprising several levels configured to transform a circularly polarized electromagnetic field into linear polarization, the polarizer comprising ridges extending inwards, the radiating element and the polarizer being made of a single piece, and disposed end-to-end in the direction, and a third portion comprising a filter, the internal leaf being prolonged in or part all of the third portion, the filter comprising a set of frequency filtration posts disposed inside the third portion and on one and the same surface of the internal leaf, the output of the filter corresponding to one of the two inputs of the polarizer, the third portion further comprising third ridges extending inwards and over all or part of the length of the third portion, the third ridges and the internal leaf being regularly distributed around the perimeter of the third portion; the radiating element, the polarizer and the filter being made of a single piece, preferably produced by an additive manufacturing technique, and the polarizer and the filter being disposed end-to-end in the longitudinal direction.

13 Claims, 30 Drawing Sheets

(51) Int. Cl.
*H01Q 13/06* (2006.01)
*H01Q 21/06* (2006.01)

(56) References Cited

FOREIGN PATENT DOCUMENTS

| | | | |
|---|---|---|---|
| EP | 2 497 146 | A1 | 9/2012 |
| WO | 2011/056287 | A1 | 5/2011 |
| WO | 2020/194270 | A1 | 10/2020 |

* cited by examiner

ANTENNA FEED FOR A DIRECT RADIATING ARRAY ANTENNA, RADIATING PANEL AND ANTENNA COMPRISING SEVERAL ANTENNA FEEDS

CROSS-REFERENCE TO RELATED APPLICATIONS

This application claims priority to foreign French patent application No. FR 2012951, filed on Dec. 10, 2020, the disclosure of which is incorporated by reference in its entirety.

FIELD OF THE INVENTION

The invention lies within the field of satellites and, more particularly, for satellites in low Earth orbit which have to transmit data throughout the world, notably in the K and Ka bands (the K and Ka bands are grouped together in space telecommunications), in the Ku band, or even in the V band. The invention is applicable for example for high speed internet.

BACKGROUND

The Ka band corresponds to a band of frequencies lying between 27 and 40 GHz. It is used notably for satellite internet. For space telecommunications, and according to the ITU (International Telecommunications Union) definition, the Ka band is grouped together with the K band and extends in reception from 27.5 to 30 GHz and in transmission from 17.7 to 20.2 GHz.

According to the ITU definition, and for space telecommunications, the V band is divided into two frequency bands: the Q band (37.5-42.5 GHz) and the V band (47.2-50.2 GHz), with smaller dimensions.

TABLE 1

| | Use for radar (GHz) | | Space radiocommunications | |
|---|---|---|---|---|
| Literal symbol | Regions of the spectrum | Examples | Nominal designation | Examples (GHz) |
| L | 1-2 | 1.215-1.4 | 1.5 GHz band | 1.525-1.710 |
| S | 2-4 | 2.3-2.5<br>2.7-3.4 | 2.5 GHz band | 2.5-2.690 |
| C | 4-8 | 5.25-5.85 | 4/6 GHz band | 3.4-4.2<br>4.5-4.8<br>6.85-7.075 |
| X | 8-12 | 8.5-10.5 | — | — |
| Ku | 12-18 | 13.4-14.0<br>15.3-17.3 | 11/14 GHz band<br>12/14 GHz band | 10.7-13.25<br>14.0-14.5 |
| K[(1)] | 18-27 | 24.05-24.25 | 20 GHz band | 17.7-20.2 |
| Ka[(1)] | 27-40 | 33.4-36.0 | 30 GHz band | 27.5-30.0 |
| V | — | — | 40 GHz band | 37.5-42.5<br>47.2-50.2 |

[(1)]In space communications, the K and Ka bands are often designated by the single symbol Ka.

The invention relates more specifically to the field of space antennas for satellites in low Earth orbit where data has to be transmitted within a wide angular range, and in particular from direct radiating array antennas. "Direct radiating array antenna" or "DRA antenna" is understood here to mean an antenna that can operate in transmission and/or in reception and that comprises an array of elementary radiating feeds linked by a beam former or beam forming network ("BFN").

Two types of orbiting satellite can be used to provide high bit rate on Earth.

A first type concerns the geostationary satellites (36 000 km) which will make it possible to provide the high bit rate on Earth in a given region or zone. On this orbit, the satellite moves exactly synchronously with the Earth and remains constantly above the same point of the surface.

A second type relies on the use of a constellation of satellites in low Earth orbit (called "LEO" for "Low Earth Orbit" satellites) configured to make it possible to provide high bit rate throughout the Earth. A constellation of satellites is a set of artificial satellites which work in concert. The satellites orbit on orbits that are chosen and synchronized such that their respective ground coverages overlap and complement one another instead of interfering with one another. One of the advantages of the constellation of satellites in low Earth orbit is the latency time between the transmission and the reception of the data because the satellites in low Earth orbit used are closer to the Earth (generally between 500 and 1200 km). The reduced latency time is an advantage for areas requiring a very rapid response (for example: for a driverless vehicle, for faster access to the data, for videocalls or videoconferences with better responsiveness, etc). The Earth is seen from the LEO satellite through a cone which can vary between +/−45° and +/−55° depending on the altitude of the satellite. This area is rapidly developing with numerous low Earth orbit satellite constellation missions and/or projects (Starlink, Kuiper, Télésat, Leosat, Oneweb, etc.). The data transmitted between these satellites and the Earth for high bit rate internet communications use the Ka bands (combining K and Ka for space), the Q and V bands but also the Ku band. Antennas are therefore sought which can operate in these bands, and in particular in the Ka band.

The antenna generally used for LEO satellites is a direct radiating array antenna, called "DRA" antenna.

The DRA antennas of the field of the invention comprise a large number of feeds (generally from 128 to 512 feeds) and each feed is composed at least of a radiating element, a polarizer and a filter which have to connect easily to the amplifiers (or to the loads). Together, the feeds form a radiating panel. An elementary radiating panel of a DRA antenna has to have a small aperture with respect to the operating frequency thereof (typically with dimensions of the order of 0.55 to 0.7λ with λ=c/f in which λ is the wavelength, c the wave propagation speed, and f represents the maximum operating frequency of the antenna). This is so as not to transmit a parasitic signal (grating lobe) to another zone of the Earth which would degrade the performance of the system. This results in feeds of very small dimensions, of the order of 5 to 9 mm in diameter in the Ka band.

It is generally sought for the feeds to observe the following constraints:

- to be easy to manufacture, notably to minimize the cost;
- to have the least possible RF losses, in particular to have the least power to dissipate within a small surface area;
- to be as compact as possible to limit the weight;
- to simplify the connection to the amplifiers.

There are DRA antennas called "printed antennas" or "patch antennas", that allow the transmission of data between LEO satellites and the Earth. They comprise elements (or "patches") printed on a flat substrate, and are designed for frequency bands of the L band or S band type, which are lower than the Ka band and for low passbands (less than 1%). The feeds (radiating element, polarizer, filter) of these antennas are manufactured using printed circuit type technology, they are therefore easy to fabricate, they are compact and of limited weight. The losses are not crippling in the frequency bands of L band or S band type. Furthermore, the patch antennas are well suited for low passbands (less than 1%).

On the other hand, for the higher frequency bands (Ka band for example), the printed antennas are no longer suitable, or else several patches of small dimensions have to be stacked on a substrate, which on the one hand is limited or difficult to produce. Also, on the other hand, even by stacking the patches, the RF losses become too great in these frequency bands (approximately 2 dB with a substrate for the Ka band), at least because of the presence of the substrate. These losses are crippling for space applications, pointlessly dissipating power in this medium where the available energy is very limited is in fact avoided.

There are other antennas in which the radiating elements are based on dielectric-charged horn waveguides or even so-called "ridged" horn waveguides as described for example in the publication "*A compacted dual linearly polarization wideband feed for parabolic reflector antenna*" by Wen-Juan Ye et al. "Ridged waveguide" is defined as a waveguide of any form (square, circular, rectangular) that can transmit a microwave signal and that comprises one or more ridges inside it. The problem with the radiating element as waveguide with a horn form, either ridged or not, is that it requires a system for circularly polarizing the wave. Since the size of the radiating element is within the 0.55 to 0.7λ range, a diverter is generally used to connect the horn to the system which makes it possible to circularly polarize the wave. In fact, the systems of OrthoMode transducer (OMT) type with septum coupler or polarizer as guide do not observe this size or bulk constraint. The diverter makes it possible, with a set of waveguides (as many as there are radiating elements) which are curved, to change the size of a link between its input and its output. The major constraint consists in having guides of identical lengths. This constraint means that the diverter is difficult to design. In addition, the use of a diverter means a much greater bulk of the radiating panel and significant RF losses due to the diverter. Furthermore, a diverter structure is difficult to produce in a single piece, even by using an additive manufacturing technique.

SUMMARY OF THE INVENTION

The invention aims to overcome the abovementioned drawbacks of the prior art.

More particularly, it aims to provide an antenna feed for producing a DRA antenna, a feed which is the most compact it can be, which generates circular polarization without using a diverter, which is suited to the Ka frequency band (or K, Q, V, Ku, etc.), in which the elementary radiating element has an aperture of small dimension with respect to the wavelength λ, and which exhibits low RF losses (typically less than 0.3 dB, even 0.2 dB in the Ka band). Furthermore, the invention aims to provide such an antenna feed which can incorporate a filter and which can be easily connected to an amplifier. Finally, the antenna feed needs to be able to be manufactured easily, and inexpensively.

A first subject of the invention making it possible to remedy these drawbacks is an antenna feed for a direct radiating array antenna, called DRA antenna, for the transmission and the reception of microwaves, said feed comprising a waveguide having at least one main part in hollow straight cylinder form extending in a longitudinal direction, the base of said cylinder having at least one axis of symmetry in its plane and the outer transverse dimensions of said main part being constant in the longitudinal direction;

the main part of the waveguide comprising, in said longitudinal direction:

- a first portion forming a radiating element, or the major part of a radiating element, said radiating element comprising first ridges extending inwards and over all or part of the length of said radiating element, said first ridges being regularly distributed around the perimeter of said radiating element and having several treads along the longitudinal direction, the number, the heights and the thicknesses of said treads being configured to allow a given variation, preferably an increase, of impedance between the input and the output of the radiating element;
- a second portion forming a polarizer, said polarizer comprising two inputs separated by an internal leaf extending in the longitudinal direction and an output corresponding to the input of the radiating element, the internal leaf comprising several levels along the longitudinal direction (X), said levels being configured to transform a circularly polarized electromagnetic field at the input into a linearly polarized electromagnetic field at the output and, in reverse, to transform a linearly polarized electromagnetic field at the output into a circularly polarized electromagnetic field at the input, the polarizer further comprising second ridges extending inwards and over all or part of the length of said polarizer, said second ridges and said internal leaf being regularly distributed around the perimeter of said polarizer;

the radiating element and the polarizer being made of a single piece, preferably produced by an additive manufacturing technique, and being disposed end-to-end in the longitudinal direction.

Disposed "end-to-end" is understood to mean that the elements are joined by their ends.

According to a preferred embodiment, the waveguide has a constant thickness over all of its length.

It is specified that the impedance between the input and the output of the radiating element increases generally between a hundred or so ohms (in the waveguide) and 377 ohms (in the air or the vacuum).

"Cylinder" or "cylindrical" is understood to mean a general definition, namely a solid generated by a straight line which runs parallel to an axis, relying on two fixed isometric and parallel planes. A straight cylinder designates a cylinder whose generatrices are at right angles to the bases. The base can be a circle or a polygon (square, hexagon, octagon, decagon, etc.). In the case where the base is a polygon, the term prism can also be used. The base must have an axis of symmetry in its own plane. That is why the term polygon of even order (that is to say with an even number of sides) is used.

"Polarizer" is understood to be an element intended to convert, on the one hand, the circularly polarized signals received into linearly polarized signals and, on the other hand, the linearly polarized signals to be transmitted into a circular polarization.

The terms "input" or "output" are defined according to the direction of circulation of the radiofrequency (RF) waves in the feed when the latter operates in transmission, that is to say from the filter or the polarizer to the horn.

A radiating element can be designated as "horn" which is a term commonly used in the field of the invention and which designates an antenna element in cylinder form, and which can comprise a complementary part in cone or truncated pyramid form. In the case of a horn comprising a complementary part in cone or truncated pyramid form, the most flared part always corresponds to the output of the radiating element.

A waveguide comprising ridges inside said waveguide can be designated by the term "ridged waveguide".

According to the invention, for all the elements forming the antenna feed, the term "length" is to be understood with reference to the longitudinal direction of the antenna feed. The term "radial" is to be understood with reference to a plane at right angles to said longitudinal direction, called "transverse plane", and the term "orthoradial" designates the direction at right angles to the radial direction in said transverse plane. The width of the leaf designates the radial dimension of the leaf, more generally the dimension of the leaf which makes it possible to split the polarizer input into two. The thickness of the leaf designates the other dimension in the transverse plane. The height of a ridge designates the radial dimension. The thickness of a ridge designates the dimension in the orthoradial direction. The height of a post designates the dimension substantially in the radial direction and the thickness of a post designates the dimension substantially in the orthoradial direction.

The solution consists in forming a radiating element as waveguide with internal ridges, and a polarizer as septum waveguide and with internal ridges connected to the radiating element in the continuity thereof (made of a single piece), the septum polarizer making it possible to have two waveguide ports. On one of the ports of the polarizer, it is possible to have a post filter in the ridged waveguide.

Thus, the antenna feed incorporates a radiating element with internal ridges compatible with a very small (0.5 to 0.7λ) DRA antenna link, but also a septum polarizer with low losses compatible with the same DRA antenna link, and which generates circular polarization without using a diverter.

The solution thus makes it possible:

- to have an elementary feed (horn, polarizer, plus, possibly, a filter) which remains in the link (gain in weight and in compactness);
- to conserve a guide (and not patch) technology to reduce the losses, even in the Ka band (and also in K, Ku, Q, V and other bands);
- to be able to be produced at low cost, in particular by an additive manufacturing technique;
- to be connected easily to the amplifiers and/or to the loads of the antenna, as described hereinbelow.

The antenna feed according to the invention can further comprise one or more of the following features taken alone or in all technically possible combinations.

The number of first ridges and/or of second ridges is preferably an even number, both at the input and at the output of the radiating element and/or of the polarizer. An even number favours the symmetry of the antenna feed. The even number also favours the introduction of the leaf of the septum polarizer which in this case is attached to two opposite ridges and makes it possible to simplify the dimensioning of the septum polarizer.

The second ridges can be in the continuity of the first ridges at the input of the radiating element (corresponding to the last tread), which facilitates the design and the manufacturer of the feed. Alternatively, the second ridges need not be in the continuity of the first ridges at the input of the radiating element.

According to one embodiment, the base of the straight cylinder is a regular polygon of even order, preferably a hexagon.

According to a first variant, the internal leaf and all or part of the first ridges and/or of the second ridges can be disposed at the vertices of the polygonal straight cylinder.

According to a second variant, the internal leaf and all or part of the first ridges and/or of the second ridges can be disposed on the internal lateral surfaces of the polygonal straight cylinder.

The first and second variants can be combined such that the internal leaf can be disposed at two opposite vertices of the polygonal straight cylinder or on two opposites internal lateral surfaces of the polygonal straight cylinder, and the first ridges and/or the second ridges can be disposed both at the vertices of the polygonal straight cylinder and on the internal lateral surfaces of the polygonal straight cylinder.

According to an alternative embodiment, the base of the straight cylinder is a circle.

According to one embodiment, the antenna feed further comprises:

- a third portion comprising a filter, the internal leaf being prolonged in all or part of said third portion, said filter comprising a set of frequency filtration posts disposed inside the third portion and on one and the same surface of the internal leaf, the output of the filter corresponding to one of the two inputs of the polarizer, said third portion further comprising third ridges extending inwards and over all or part of the length of said third portion, said third ridges and the internal leaf being regularly distributed around the perimeter of said third portion;

the radiating element, the polarizer and the filter being made of a single piece, preferably produced by an additive manufacturing technique, and the polarizer and the filter being disposed end-to-end in the longitudinal direction.

Preferably, the number of third ridges is an even number, and both at the input and at the output of the filter. An even number favours the symmetry of the antenna feed.

The third ridges can be in the continuity of the second ridges of the polarizer, which facilitates the design and manufacture of the feed. Alternatively, the third ridges need not be in the continuity of the second ridges.

According to one embodiment, the waveguide is entirely in hollow straight cylinder form over all of its length. In other words, the main part represents all the length of the waveguide.

According to an alternative embodiment, the waveguide comprises a main part in hollow straight cylinder form and a complementary part at the output of the radiating element, said complementary part being able to be in cone or truncated pyramid form, the most flared part being disposed at the output of the radiating element. The complementary part is free of grooves. Furthermore, the length of the complementary part is very small relative to the length of the main part of the waveguide.

A second subject of the invention is a radiating panel for a direct radiating array antenna, said panel comprising a plurality of feeds according to the invention comprising a plurality of antenna feeds according to the first subject of the invention; said radiating panel being made of a single piece, preferably produced by an additive manufacturing technique.

Preferably, the feeds of a same radiating panel are all substantially identical.

The radiating panel comprises feeds that each have radiating elements of small dimensions (0.5 to 0.7λ) with very low RF losses (typically less than 0.3 dB, or even 0.2 dB in the Ka band) and is easy to manufacture.

A third subject of the invention is a direct radiating array antenna, called DRA antenna, comprising:

a radiating panel according to the second subject of the invention;

at least one amplifier and/or one load connected to the radiating panel, at the input of at least one filter and/or an input of at least one polarizer.

According to an advantageous embodiment, the radiating panel is connected to the at least one amplifier and/or the at least one load via at least one Vivaldi antipodal transition, and preferably via at least one transition/adaptation designed to change the position, the dimensions and/or the form of the ridges of the waveguide at the input of the feed so as to be able to position the Vivaldi transition in said waveguide.

The antenna feed, the radiating panel and the direct radiating array antenna according to the invention can comprise any one of the features previously described, taken alone or in all technically possible combinations with other features.

BRIEF DESCRIPTION OF THE DRAWINGS

Other features, details and advantages of the invention will emerge on reading the description given with reference to the attached drawings which are given by way of example and which represent, respectively.

Throughout these figures, identical references can designate identical or similar elements.

Furthermore, the various parts represented in the figures are not necessarily to a uniform scale, to render the figures more legible.

DETAILED DESCRIPTION

In the detailed description, the radiating element can be designated by the term "horn".

The longitudinal direction is identified by the reference X and the arrow is oriented in the direction from input to output of each of the elements (horn, polarizer, filter). The longitudinal direction X corresponds also to the axis of the cylinder. The polarizer is disposed end-to-end with the horn in the longitudinal direction, and the filter, if necessary, is disposed end-to-end with the polarizer in the longitudinal direction.

For all the embodiments and variants presented hereinbelow in the description, and more generally according to the invention, the antenna feed can be made of a metal, metallized or metallizable material. For example, it can be aluminium, titanium, or any other material which can be surface-metallized. Preferably, the material of the antenna feed is designed to fabricate the antenna feed, and to fabricate the radiating panel of the array antenna (comprising a plurality of feeds in a single piece) by an additive manufacturing technique.

According to the invention, a feed comprises a waveguide having at least one main part in hollow straight cylinder form extending in a longitudinal direction X, the base of said cylinder having at least one axis of symmetry in its plane. The outer transverse dimensions of this main part are constant in the longitudinal direction X. Hereinafter in the detailed description, it is accepted that the form of the feed corresponds to the form of the waveguide.

The feeds represented in the figures and described hereinbelow in the description are in hollow straight cylinder form, and this is so over all their length (in other words, the main part extends over all the length of the waveguide).

Alternatively, according to a variant embodiment not represented, the feed can comprise, at the output of the radiating element, a complementary part in cone or truncated pyramid form, the most flared part being disposed at the output of the radiating element. Instead of a cone or truncated pyramid, the feed can comprise, at the output of the radiating element, a complementary part of cylindrical form, of outer transverse dimensions and/or of base form that all different from the main part. The complementary part is free of grooves. Furthermore, the length of the complementary part is very small relative to the main part of the waveguide. For example, it represents of the order of 1/10, or even 1/20, of the length of the horn and can represent 1/100 of the overall length of the feed.

Figure 1A:
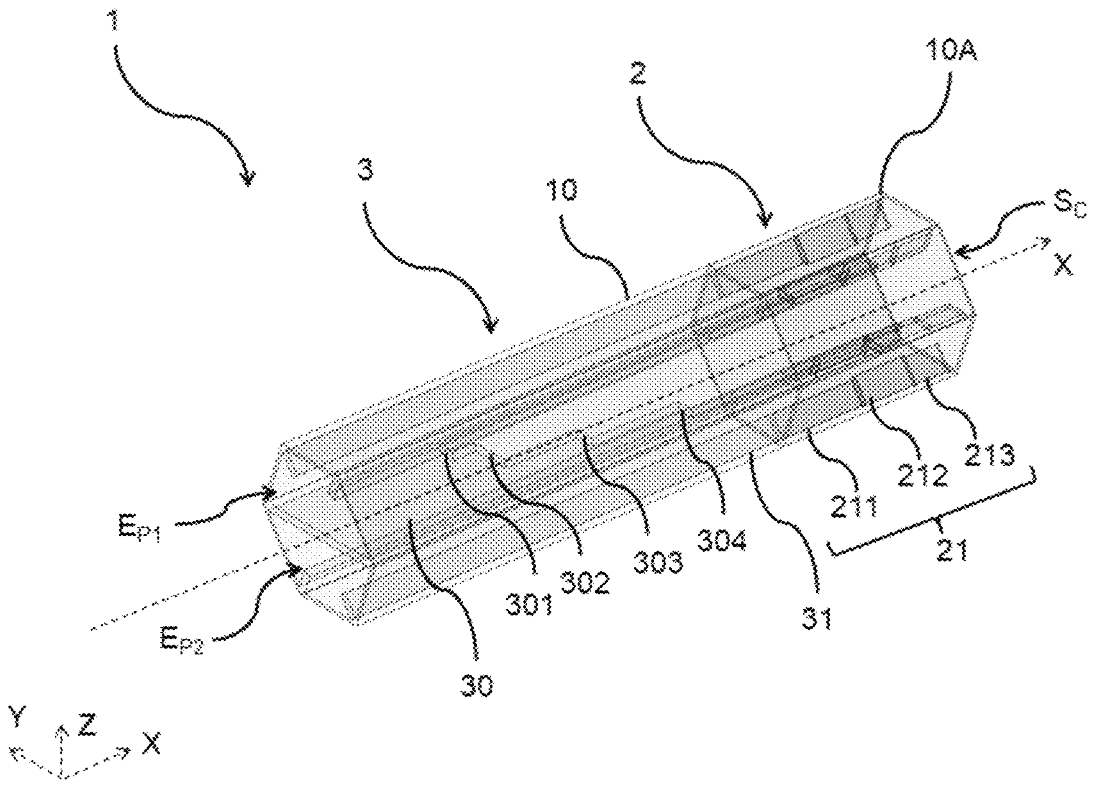
FIGS. 1A-1B represent an antenna feed according to a first embodiment of the invention.
Figure 1B:
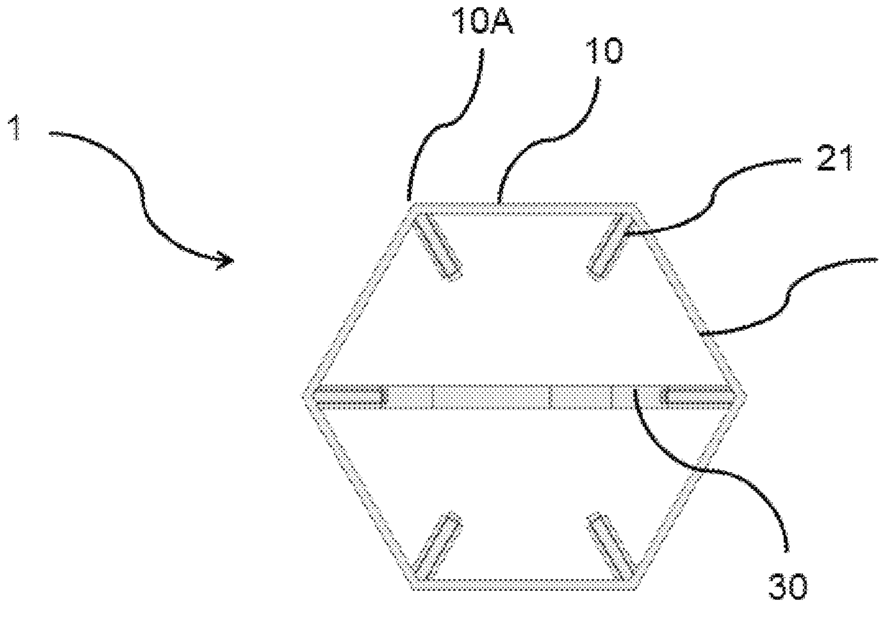

FIGS. 1A and 1B represent an antenna feed according to a first embodiment of the invention, FIG. 1A being a 3D view and FIG. 1B being a side view (seen from the output of the horn). The antenna feed 1 illustrated is in the form of a waveguide which comprises a first, horn-forming portion 2 and a second, polarizer-forming portion 3, the two forming a single piece (waveguide) whose outer form is a straight cylinder with hexagonal base 10, the cylinder being hollow.

The horn 2 represented comprises an input $E_C$ (referenced in FIG. 3A) and an output $S_C$. It has an outer hexagonal cylinder form 10, and comprises six ridges 21 (first ridges), which protrude towards the interior of said horn from each vertex 10A of the hexagonal cylinder 10 and extend in the longitudinal direction X. The six first ridges all have the same forms and they are conformed with treads along the longitudinal direction X. In the example represented, the first ridges are staged according to the three treads 211, 212, 213 whose dimensions (heights, thicknesses and/or lengths) vary along the longitudinal direction X. The number and the dimensions of the treads are configured to allow a given variation of impedance between the input and the output of the radiating element.

An important feature of the invention is that the transverse outer dimensions of the cylindrical main part of the waveguide (here the hexagonal cylinder) do not vary in the longitudinal direction X and notably do not decrease. It is the ridges in the horn, with their treads, which make it possible to make the impedance vary in said horn. Thus, that makes it possible to have, at the horn input, the widest possible aperture to be able to then produce the septum polarizer which is connected at the horn input. This makes it possible to introduce the leaf of the polarizer and to push the first upper mode as far as possible away from the operating band of the array antenna. This particular feature is all the more true for cylindrical (or prismatic) horns with square base for which the cutout frequency of the first upper mode appears for a lower frequency.

The horn is described in more detail hereinbelow in the present description, according to different variants (not limiting), each of the variants being able to be implemented in the first embodiment, or in the second embodiment described below.

The polarizer 3 comprises two inputs $E_{P1}$, $E_{P2}$ separated by an internal leaf 30, or septum, extending in the longitudinal direction X, and an output $S_P$ (referenced in FIG. 4A) which corresponds to the input $E_C$ of the horn 2. The internal leaf comprises several levels 301, 302, 303, 304 in the longitudinal direction X. The levels are configured to transform a circularly polarized electromagnetic field at the polarizer input into a linearly polarized electromagnetic field at the polarizer output, and vice versa. Regularly distributed on either side of the leaf 30, at the polarizer inputs $E_{P1}$, $E_{P2}$, four ridges 31 (second ridges) protrude towards the interior of said polarizer from each vertex 10A of the hexagonal cylinder 10 and extend in the longitudinal direction X. Furthermore, at the output $S_P$ of the polarizer, two other second ridges 32 (referenced in FIGS. 4A and 4B) are formed, which correspond to the two radial ends of the leaf 30 which disappears at the polarizer output. The second ridges 31, 32 have the same thicknesses and heights as the first treads 211 of the first ridges 21. In other words, at the output of the polarizer, the second ridges 31, 32 are in the continuity of the corresponding first ridges 21 at the input of the horn 2. The dimensions of the second ridges are represented as constant in the longitudinal direction, and are substantially equal to one another.

The ridges in the polarizer make it possible to reduce the minimum operating frequency thereof and allow the propagation of the wave therein. The dimensions of the ridges are such that the main mode is propagated in the polarizer. On the other hand, the cutoff frequency of the first upper mode needs to be greater than the maximum operating frequency for the latter not to be able to be propagated in the structure. Furthermore, that makes it possible to reduce the transverse dimensions of the polarizer with respect to a conventional septum polarizer, in order to make it compatible with the aperture of the horn.

The polarizer is described in more detail hereinbelow in the present description, according to different variants (not limiting), each of the variants being able to be implemented in the first embodiment, or in the second embodiment described below.

Figure 2A:
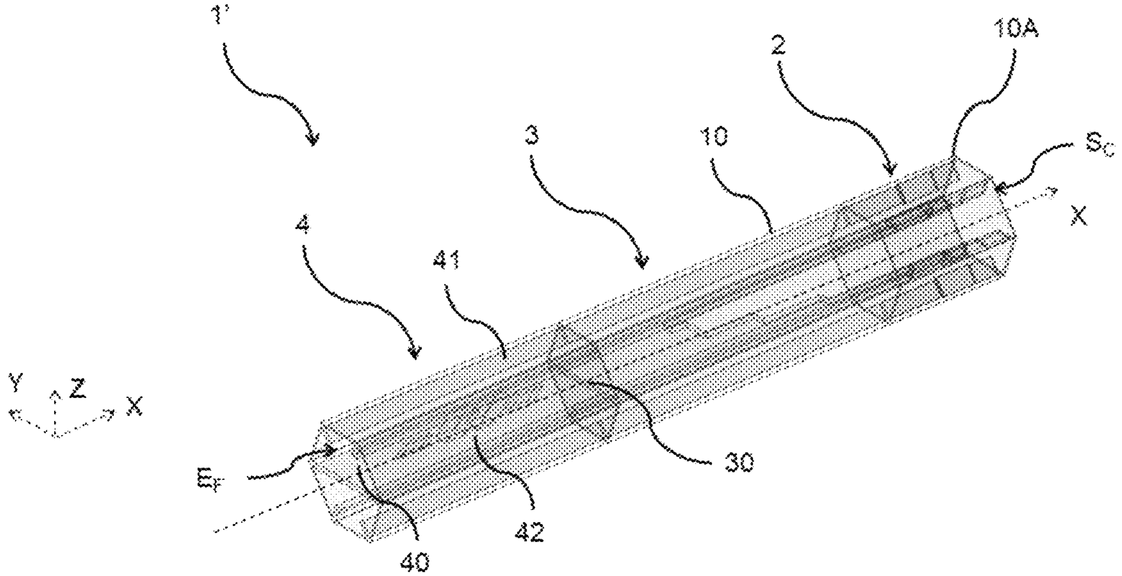
FIGS. 2A-2D represent an antenna feed according to a second embodiment of the invention.
Figure 2B:
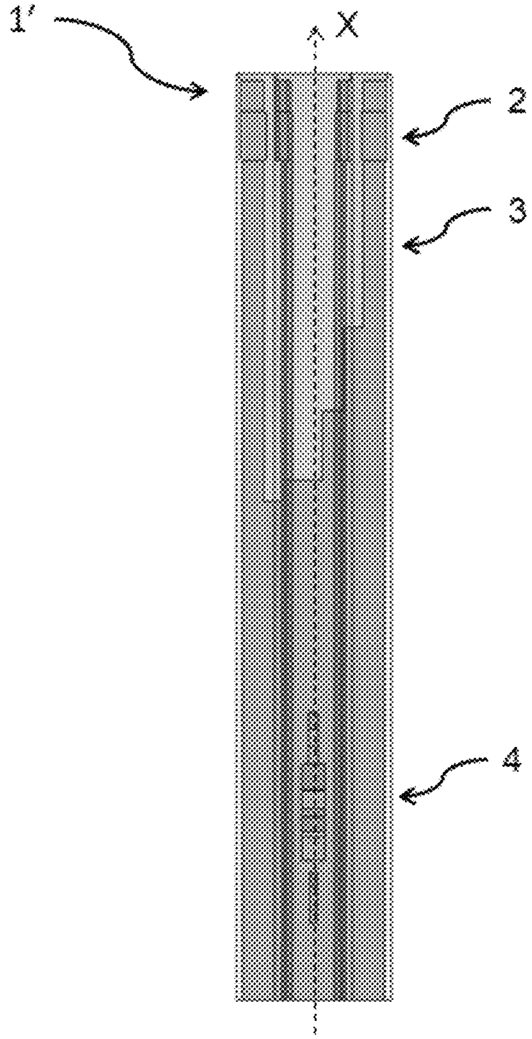
Figure 2C:
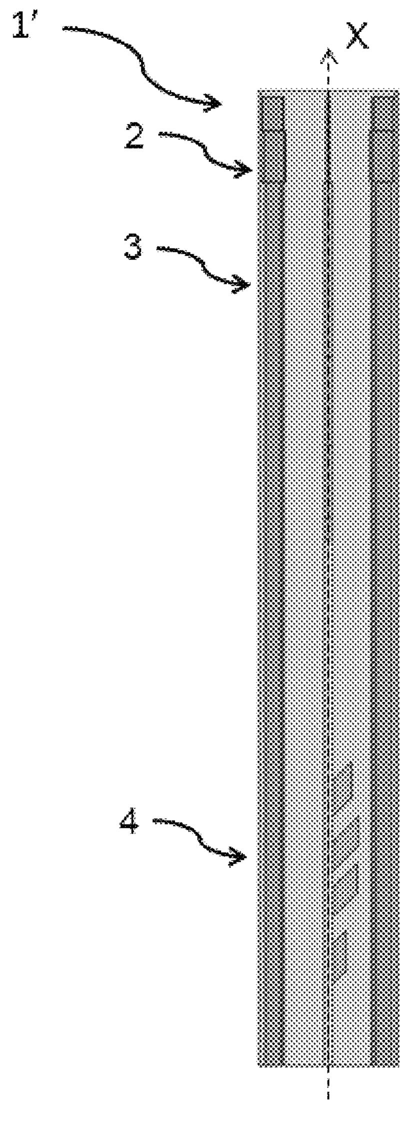
Figure 2D:
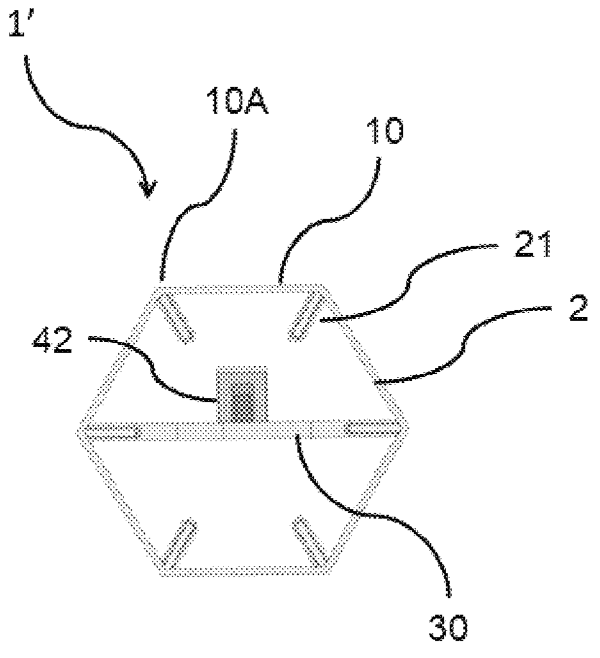

FIGS. 2A, 2B, 2C and 2D represent an antenna feed according to a second embodiment of the invention which differs from the first embodiment in that it further comprises a third portion 4 which comprises a filter 40. FIG. 2A is a 3D view, FIG. 2B is a view in cross-section on a plane passing through the axis X and the axis Y (corresponding to the plane of the leaf), FIG. 2C is a view in cross-section on a plane passing through the axis X and the axis Z, and FIG. 2D is a side view (seen from the output of the horn).

The antenna feed 1' illustrated thus comprises a first, horn-forming portion 2, a second, polarizer-forming portion 3 and a third portion 4 comprising a filter 40, the three portions forming a single piece of which the outer form is a straight cylinder with hexagonal base 10.

The filter 40 corresponds to half the hexagonal straight cylinder in the third portion 4 (the output of the filter corresponds to one of the two inputs of the polarizer). Inside the half-cylinder, the filter comprises, in the continuity of one of the two inputs of the polarizer, a series 42 of frequency filtering posts, the posts being positioned after one another in the longitudinal direction X and disposed on the central leaf. The filtering posts are chosen to allow certain frequencies to pass while other frequencies are retained.

In the example represented, the posts have a 45° inclination in order for the antenna feed to be produced by additive manufacturing in one and the same piece, therefore in the same material as the horn and the polarizer. The different posts have dimensions (lengths, thicknesses and/or heights) that can differ from one post to another. Furthermore, the distances between two adjacent posts can differ.

The dimensions of the posts and the distance between two adjacent posts are defined to make it possible to produce a filter of "combline filter" type. A conventional "combline" type filter is generally produced by introducing metal rods into a rectangular guide, the size of the rods and the distance relative to the top wall of the guide making it possible to transmit or reject certain frequencies. This type of filter is well known to the person skilled in the art. According to the invention, the filter is dimensioned to produce a low-pass filter.

The third portion 4 further comprises third ridges 41 extending towards the interior thereof and over all or part of the length of said third portion. In the example represented, said third ridges are in the continuity of the second ridges. These third ridges are dimensioned in such a way that the wave can be propagated in the wave guide.

The filter is described in more detail hereinbelow in the present description, according to different possible variants (not limiting). Any variant can be implemented in the second embodiment.

Figure 3A:
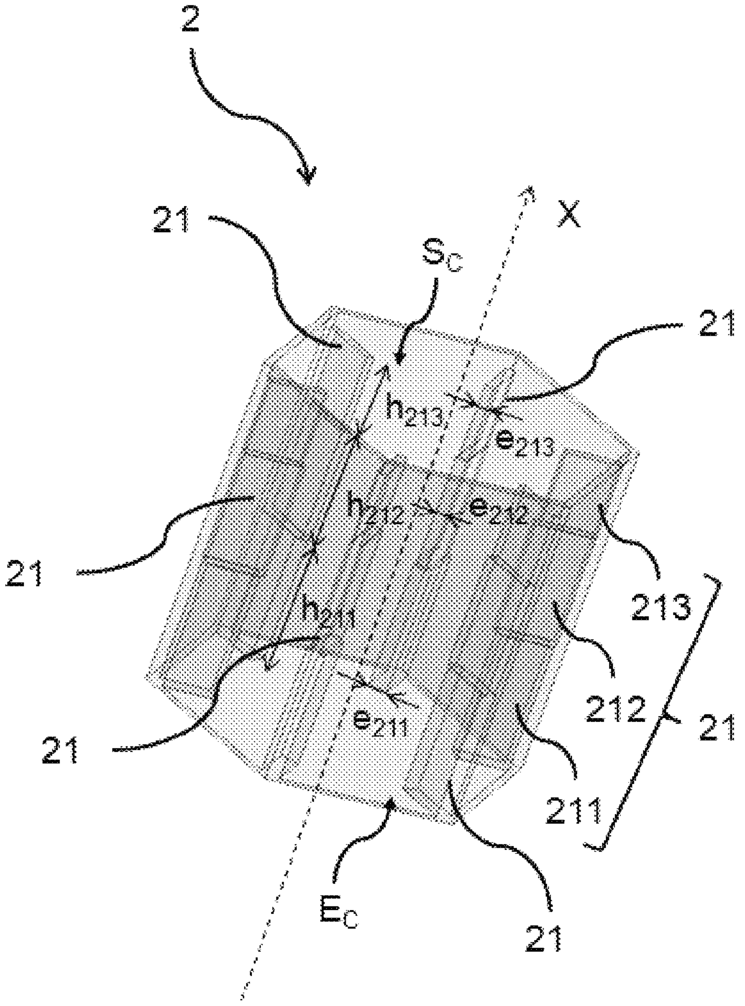
FIGS. 3A-3B represent in detail a hexagonal horn according to a first variant of the invention.
Figure 3B:
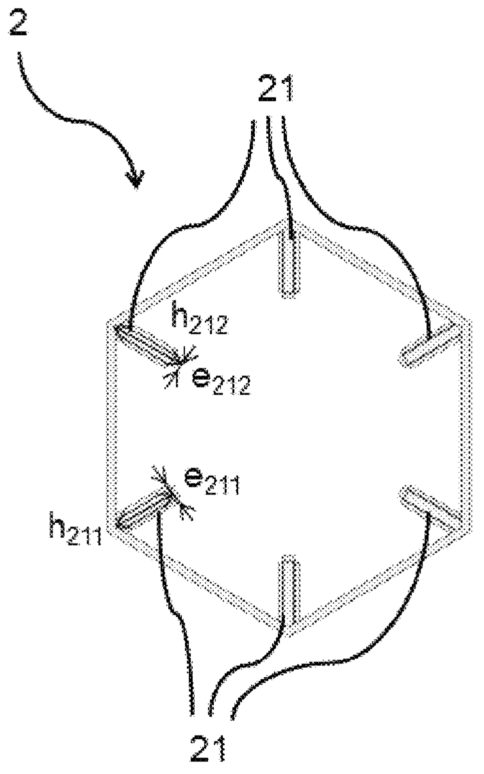

FIGS. 3A (3D view) and 3B (side view) represent in detail a hexagonal horn 2 according to a first variant of the invention, which corresponds to the hexagonal horn of FIGS. 1A, 1B, 2A and 2B. The hexagonal horn 2 comprises six first ridges 21 which protrude towards the interior of said horn from each vertex of the hexagonal cylinder. The six first ridges all have the same forms and are conformed as treads along the longitudinal direction X. In the example illustrated, three treads 211, 212, 213 are represented whose dimensions (heights, thicknesses and/or lengths) vary along the longitudinal direction, the thicknesses of the treads decreasing in the direction going from the input $E_C$ to the output $S_C$ of the horn (direction of circulation). Thus, the thickness $e_{211}$ of the first tread 211 is greater than the thickness $e_{212}$ of the second tread 212, itself being greater than the thickness $e_{213}$ of the third tread. Moreover, the height $h_{211}$ of the first tread 211 is slightly greater than the height $h_{212}$ of the second tread 212, which is itself greater than the height $h_{213}$ of the third tread 213.

Generally, it is not necessary for the thickness and the heights of the treads to vary increasingly or decreasingly in the direction of circulation, the latter being able to take any values provided that that makes it possible to produce the desired impedance variation.

Whatever the variant embodiment, and more generally according to the invention, the number of treads and the dimensions of the treads of the first ridges are parameters that can be configured by the person skilled in the art, so as to allow a given variation of impedance between the input and the output of the horn. Thus, there is a very large number of possible configurations, which cannot all be described in the present description. As an example, the number of treads can be equal to three as illustrated, or four.

Furthermore, the number of first ridges and their locations are not to be limited to the embodiments and variants illustrated.

The first ridges can all have the same forms, as illustrated, or have different forms.

Preferably, the number of first ridges is an even number, both at the input and at the output of the horn, and they are disposed regularly around the perimeter of the cylinder. An even number favours the symmetry of the antenna feed. The even number then favours the introduction of the leaf of the septum polarizer which in this case is attached to two opposite ridges and makes it possible to simplify the dimensions of the septum polarizer.

According to a particular embodiment, a last section without any ridge (tread of zero height) can be added at the output of the horn in order to enhance the efficiency and the directivity thereof (these two concepts are well known to the person skilled in the art). In particular, if the horn has a complementary part, for example in cone or truncated pyramid form, at the output of said horn, this complementary part does not include any ridge.

Figure 4A:
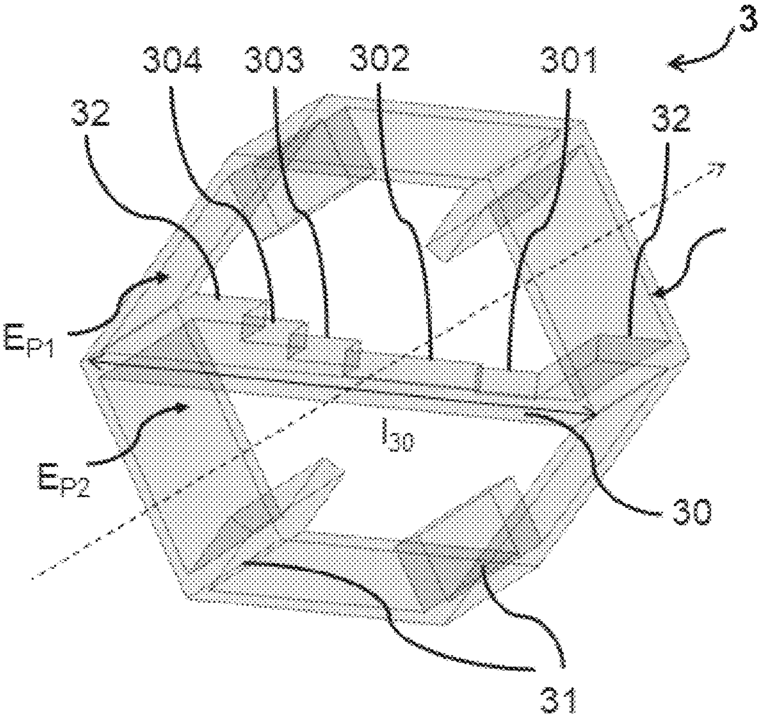
FIGS. 4A-4C represent in detail a hexagonal polarizer according to the first variant of the invention.
Figure 4B:
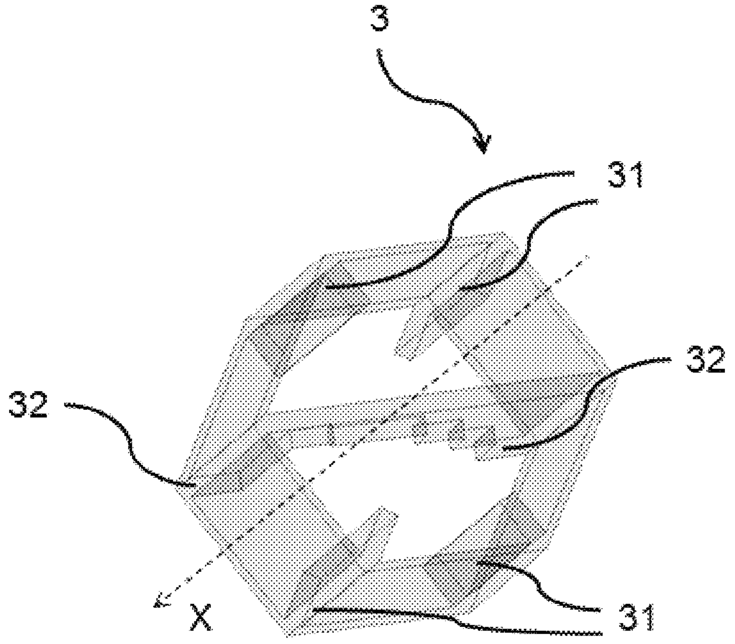
Figure 4C:
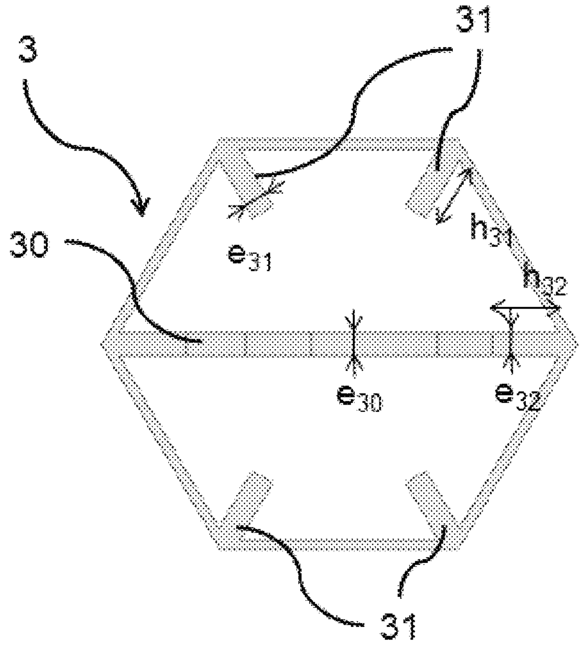

FIGS. 4A (3D view in the input-output direction of the polarizer), 4B (3D view in the output-input direction of the polarizer) and 4C (side view) represent a hexagonal polarizer according to the first variant of the invention, which corresponds to the hexagonal polarizer of FIGS. 1A, 1B, 2A and 2B. The hexagonal polarizer 3 comprises two inputs $E_{P1}$, $E_{P2}$ separated by an internal leaf 30, or septum, extending in the longitudinal direction X. Transversely, the internal leaf 30 extends between two radially opposite vertices of the cylinder, i.e. over a width $l_{30}$. The internal leaf 30 comprises four levels 301, 302, 303, 304 configured to transform a circularly polarized electromagnetic field at the input into a linearly polarized electromagnetic field at the output, and vice versa. However, this number of levels is not limiting and can be less than four (two or three) or five or more.

On either side of the leaf 30, at the polarizer inputs $E_{P1}$, $E_{P2}$, four second ridges 31 protrude towards the interior of said polarizer from each vertex of the hexagonal cylinder and extend in the longitudinal direction X. Furthermore, at the output $S_P$ of the polarizer, two additional levels on the two radial ends of the internal left (ends situated on the vertices of the cylinder) form two complementary second ridges 32 at the polarizer output $S_P$. In other words, at the output of the polarizer, these two complementary second ridges 32 formed at the polarizer output correspond to the two ends of the leaf 30 which disappear at the output of said polarizer.

The thicknesses $e_{31}$ and the heights $h_{31}$ of the four second ridges 31 are constant in the longitudinal direction and are substantially equal to one another. The thicknesses $e_{32}$ and the heights $h_{32}$ of the two complementary second ridges 32 are constant in the longitudinal direction and are substantially equal to one another and to those of the four second ridges 31.

Whatever the variant embodiment, and more generally according to the invention, the number of levels of the internal leaf, the thickness of the leaf and the dimensions of the levels can be configured by the person skilled in the art. The leaf of the polarizer can, furthermore, have forms different from that represented. In addition to the staircase form illustrated, the literature contains a wide number of forms other than the staircase form, which forms can also be used in the context of the invention. One example that can be cited is a blade whose form has been approximated by a mathematical equation of the Legendre polynomial type. Any other form suited to the function of transforming a linearly polarized electromagnetic field into a circularly polarized electromagnetic field, and vice versa, can be envisaged. Thus, there is a very large number of possible configurations, which cannot all be described in the present description.

Preferably, the thickness $e_{30}$ of the internal leaf 30 is substantially equal to the thickness $e_{31}$, $e_{32}$ of the second ridges 31, 32. This makes it possible to simplify the design and the manufacture of the antenna feed, and of the array antenna, and favour the overall symmetry.

Preferably, the thickness $e_{31}$, $e_{32}$ (and/or the height $h_{31}$, $h_{32}$) of the second ridges 31, 32 is substantially equal to the thickness $e_{211}$ (and/or the height $h_{211}$) of the first ridges 21 (first tread 211) at the input of the horn. The second ridges 31 can thus be positioned in the continuity of the first ridges 21 at the input $E_C$ of the horn 2.

Figure 5A:
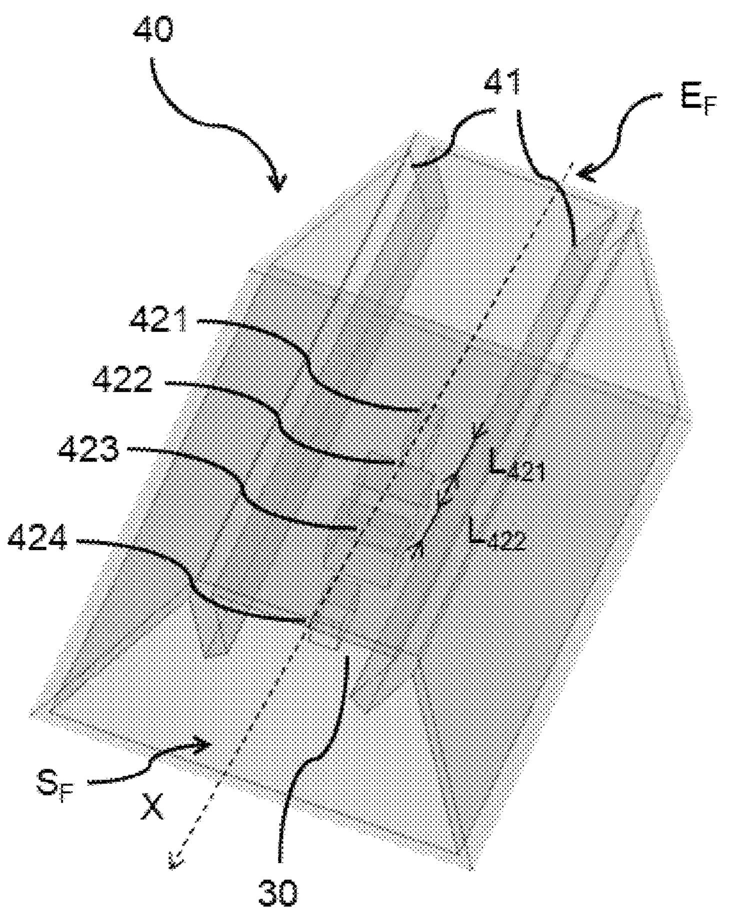
FIGS. 5A-5C represent in detail a filter according to the first variant of the invention.
Figure 5B:
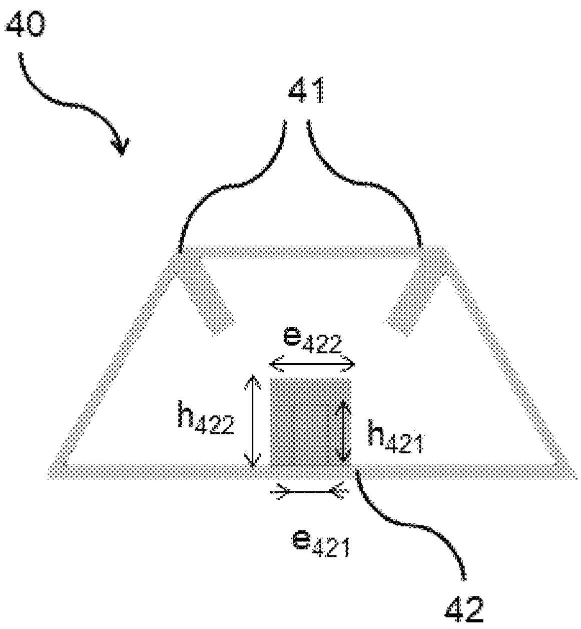
Figure 5C:
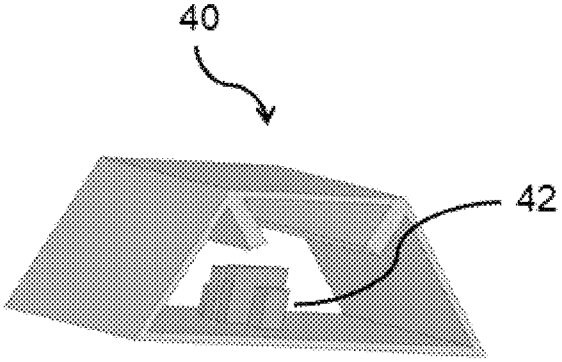

FIGS. 5A (3D view), 5B (side view) and 5C (other 3D view) represent a filter in detail, which corresponds to the filter 40 of FIGS. 2A and 2B.

The filter is formed only on one of the inputs of the polarizer because the antenna operates in single-polarization mode.

The filter 40 corresponds to half the hexagonal straight cylinder in the third portion 4 (the output of the filter corresponds to one of the two inputs of the polarizer). Inside the half-cylinder, the filter comprises, in the continuity of one of the two inputs of the polarizer, a series 42 of four frequency filtering posts 421, 422, 423, 424, the posts being positioned one after the other in the longitudinal direction X and disposed on the internal leaf 30 (prolonged between the polarizer and the third portion). The filtering posts are chosen to allow certain frequencies to pass while other frequencies are retained.

The different posts have dimensions (lengths, thicknesses and/or heights) that can differ from one post to the other. Furthermore, the distances between two adjacent posts can differ.

In the example illustrated, the second and third posts 422, 423 have equivalent dimensions (thickness $e_{422}$, height $h_{422}$, length $L_{422}$), and the first and fourth posts 421, 424 also have dimensions (thickness $e_{421}$, height $h_{421}$, length $L_{421}$) that are equivalent but different from the second and third posts. Furthermore, the four posts are spaced apart from one another by distances which are not necessarily equal.

The number of posts illustrated is not limiting, as for the dimensions of the posts and the distances between the adjacent posts.

As indicated previously, the dimensions of the posts and the distance between two adjacent posts are defined to make it possible to produce a "combline filter" type filter of low-pass filter type, the form of which can be adapted in order to incorporate it in the ridged waveguide.

Furthermore, the dimensions and the number of posts depend on the desired value for the rejection of the filter. If the rejection level is to be increased, the number of posts is increased.

The third portion 4 further comprises third ridges 41 extending towards the interior and over all or part of the length of said third portion, said third ridges being in the continuity of the second ridges 31, 32. These third ridges are dimensioned in such a way that the wave can be propagated in the waveguide.

Figure 11:
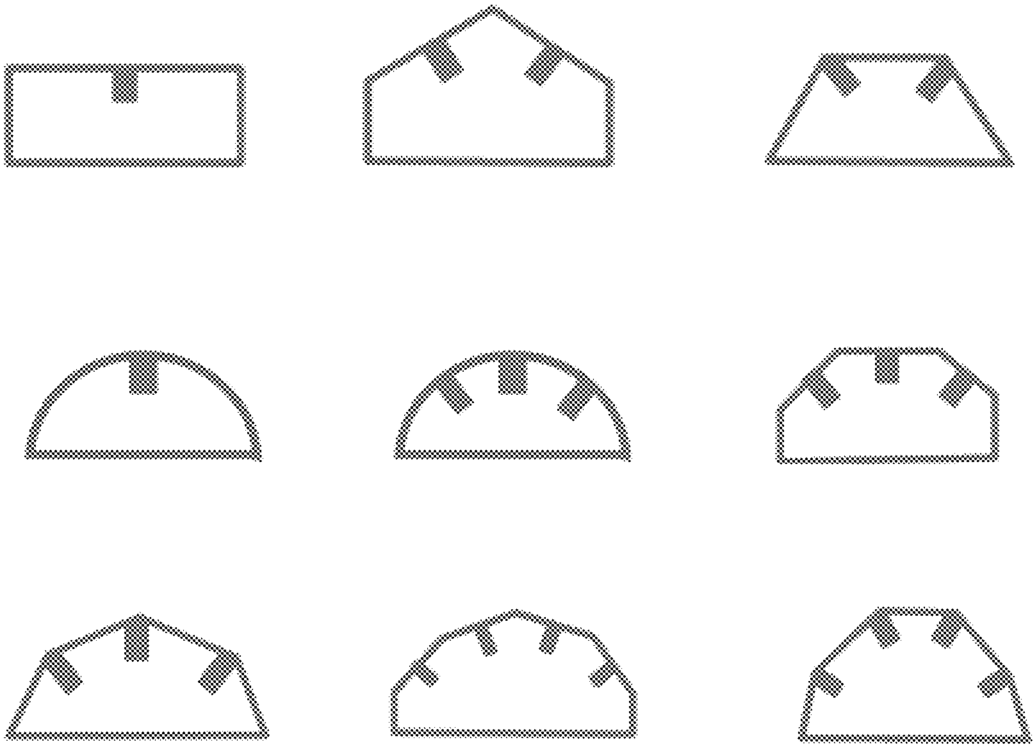
FIG. 11 illustrates several forms of filters for a feed according to the invention.

Since the form of the polarizer is highly variable, and dependent on the form of the horn (cylinder with circular or polygonal base, etc.), it is possible to have a wide variety of forms for the ridged waveguide forming the filter. Possible, but not limiting, forms are illustrated in FIG. 11 (illustrated with the ridges but without the posts).

Figure 12A:
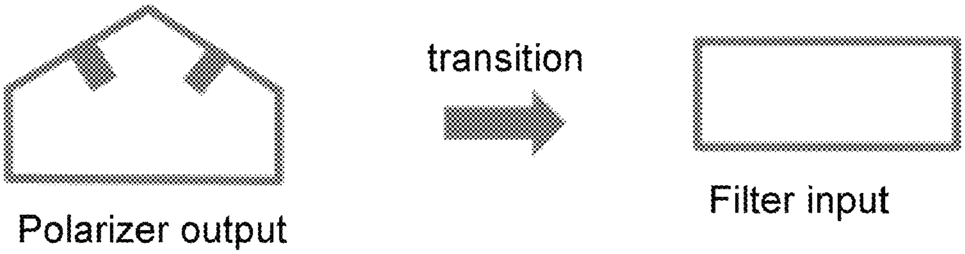
FIGS. 12A-12C illustrate several optional transitions between the filter and the polarizer for a feed according to the invention.
Figure 12B:
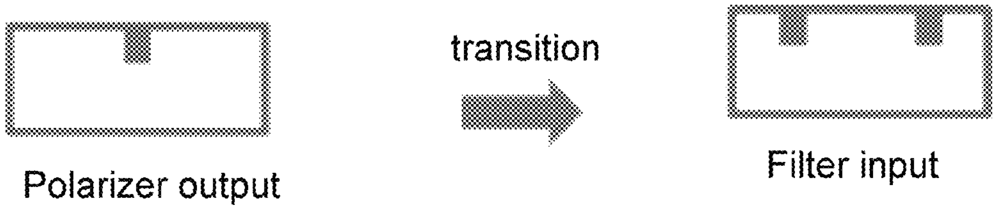
Figure 12C:
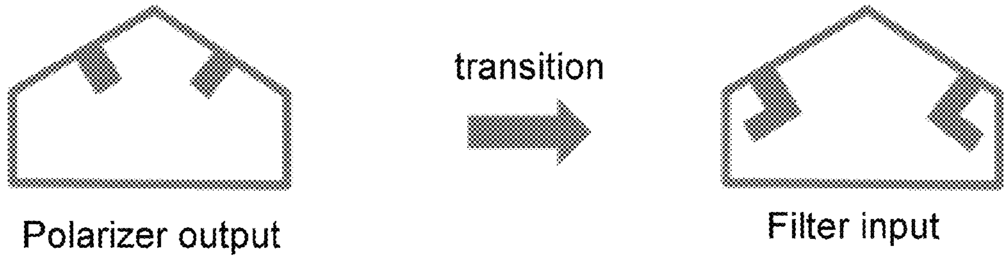

Furthermore, in order to facilitate the insertion of the posts at the centre of the filter, provision can be made to produce a transition between the polarizer and the filter which will make it possible to change the disposition of the ridges inside the third portion comprising the waveguide comprising the filter. One condition is to ensure that the operating frequency of the waveguide is lower than the minimum operating frequency, both before and after the transition. As illustrated in FIGS. 12A to 12C, the transition can be produced by removing ridges (FIG. 12A), by adding ridges (FIG. 12B), or even by bending existing ridges (FIG. 12C), or even by combining several of these solutions.

Figure 6A:
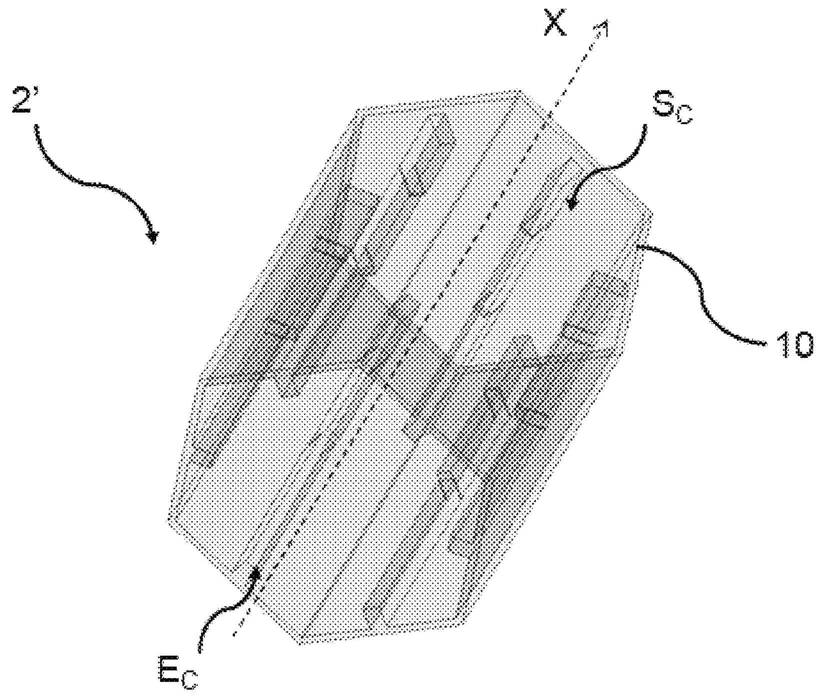
FIGS. 6A-6B represent in detail a hexagonal horn according to a second variant of the invention.
Figure 6B:
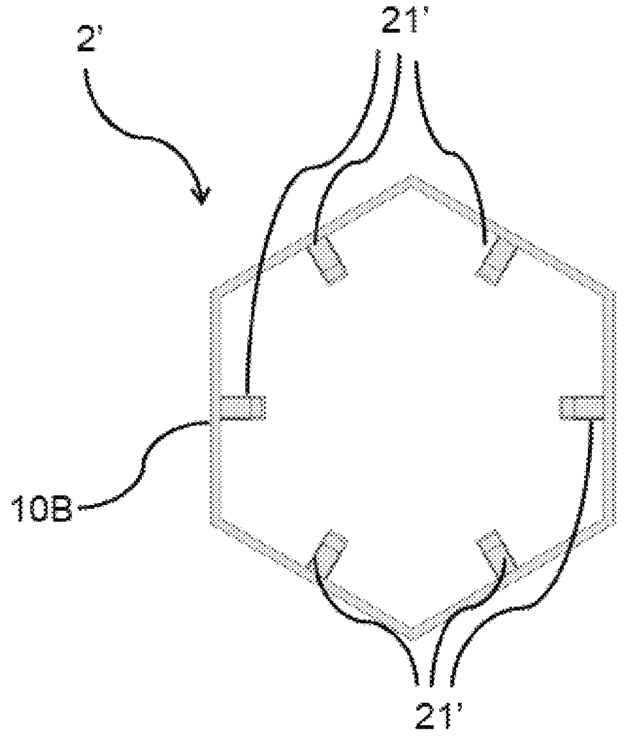

FIGS. 6A (3D view) and 6B (side view) represent a hexagonal horn 2' according to a second variant of the invention, which differs from the first variant in that the first ridges 21' are not disposed at the vertices of the hexagonal cylinder 10 but in the middle of the lateral surfaces 10B of said cylinder. In the example represented, there are six first ridges each with three treads, the treads decreasing between the input and the output of the horn but, as indicated previously, it is not necessary for the thicknesses and the heights of the treads to vary increasingly or decreasingly in the direction of circulation, the latter being able to take any values provided that that makes it possible to produce the desired impedance variation.

The number of first ridges and of treads is not limiting. Preferably, there is an even number of first ridges, both at the input and at the output of the horn.

Figure 7A:
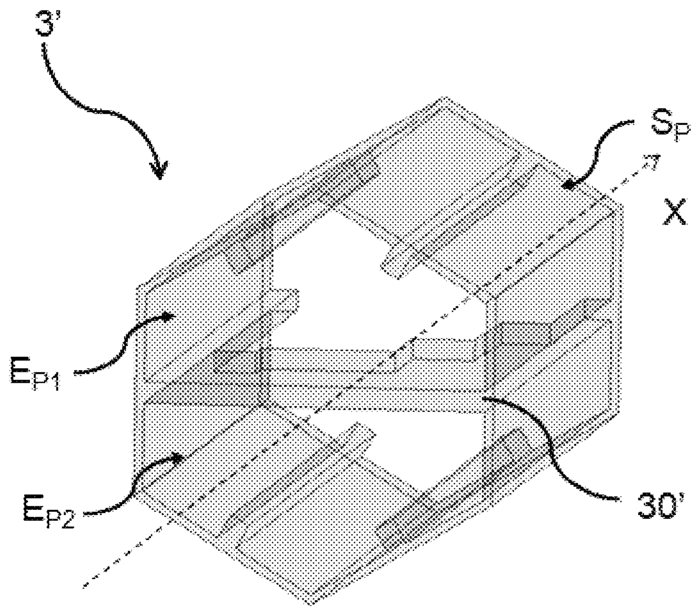
FIGS. 7A-7C represent in detail a hexagonal polarizer according to the second variant of the invention.
Figure 7B:
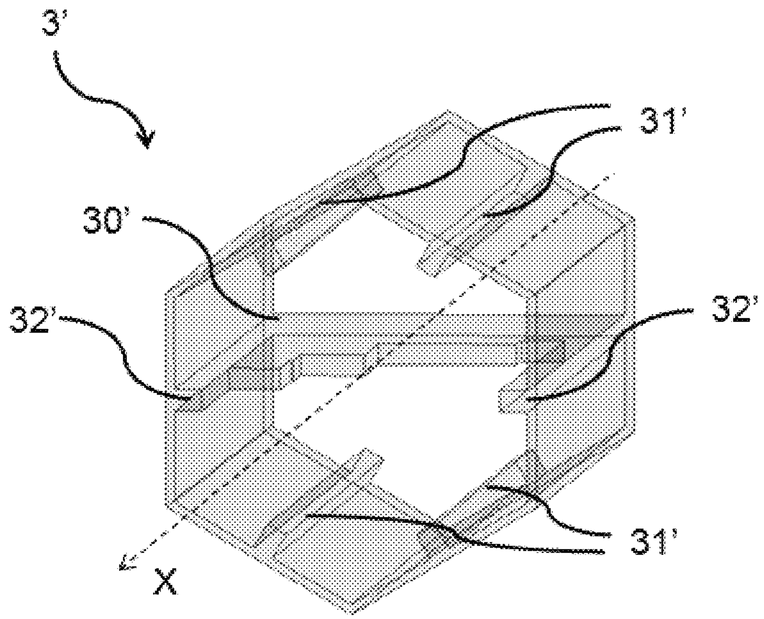
Figure 7C:
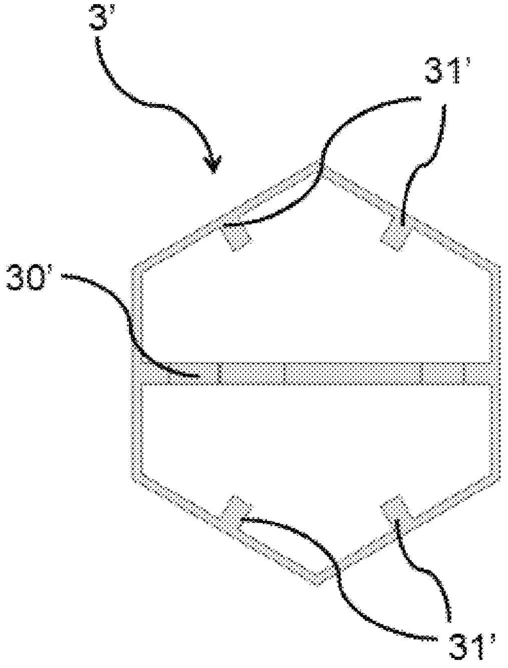

FIGS. 7A (3D view in the input-output direction of the polarizer), 7B (3D view in the output-input direction of the polarizer) and 7C (side view) represent a hexagonal polarizer 3' according to the second variant of the invention, which differs from the first variant in that the second ridges 31', 32' and the internal leaf 30 are not disposed at the vertices of the hexagonal cylinder but in the middle of the lateral surfaces of said cylinder. In the example represented, there are six first ridges each with three treads. However, the number of ridges is not limiting. Preferably, there is an even number of second ridges, both at the input and at the output of the polarizer.

The first and second variants can be combined with one another, such that the first ridges (and the second ridges) can be disposed both at the vertices of the hexagonal cylinder and in the middle of the lateral surfaces of said cylinder. It is thus possible to obtain, for example, 12 first ridges in the horn and 12 second ridges at the polarizer output.

The second ridges are generally disposed in the same locations over all the length occupied by said second ridges.

The first ridges can be disposed in the same locations over all the length occupied by the first ridges, as illustrated.

Alternatively, the first ridges can be positioned according to a first configuration over a first length (or first section), then according to a second configuration over a second length (or second section), then possibly even according to a third configuration over a third length (or third section), etc. It is however important to observe the impedance steps and observe the best possible symmetry of the horn (and of the antenna feed) with respect to the longitudinal axis X.

Figure 8:
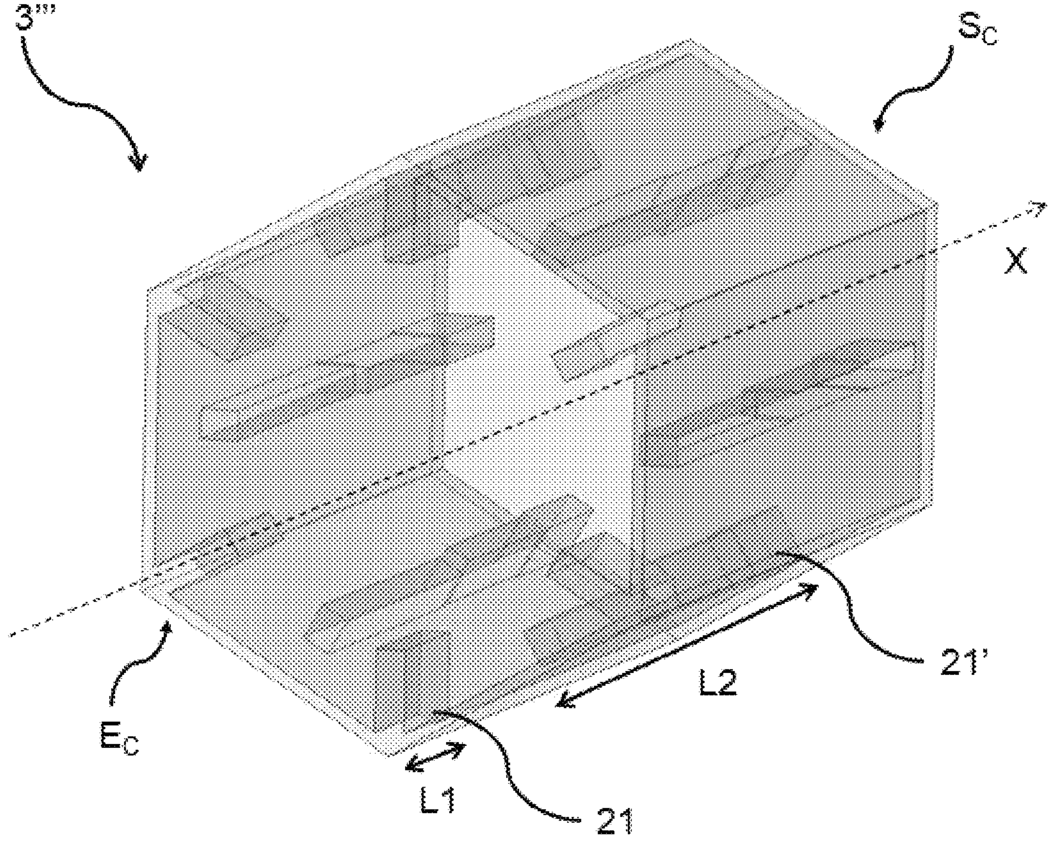
FIG. 8 represents in detail a hexagonal horn according to a third variant of the invention.

An example of this alternative (third variant) is illustrated in FIG. 8 which represents a horn 3''' in which first ridges 21 (configured in a single tread) are positioned on the vertices of a hexagonal straight cylinder at the input $E_C$ of the horn over a first section L1, then first ridges 21' (configured in three treads) are positioned in the middle of the lateral surfaces of the hexagonal cylinder over a second section L2 that can run to the output $S_C$ of the horn. This configuration is obviously not limiting.

In a preferential embodiment, the second ridges at the output of the polarizer are positioned in the continuity of the first ridges at the input of the horn. Alternatively, it is possible to envisage a change of location of the ridges between the output of the polarizer and the input of the horn (for example at the vertices in the polarizer then in the middle of the surfaces in the horn, or vice versa), always within the limit of observance of the desired impedances.

Figure 9A:
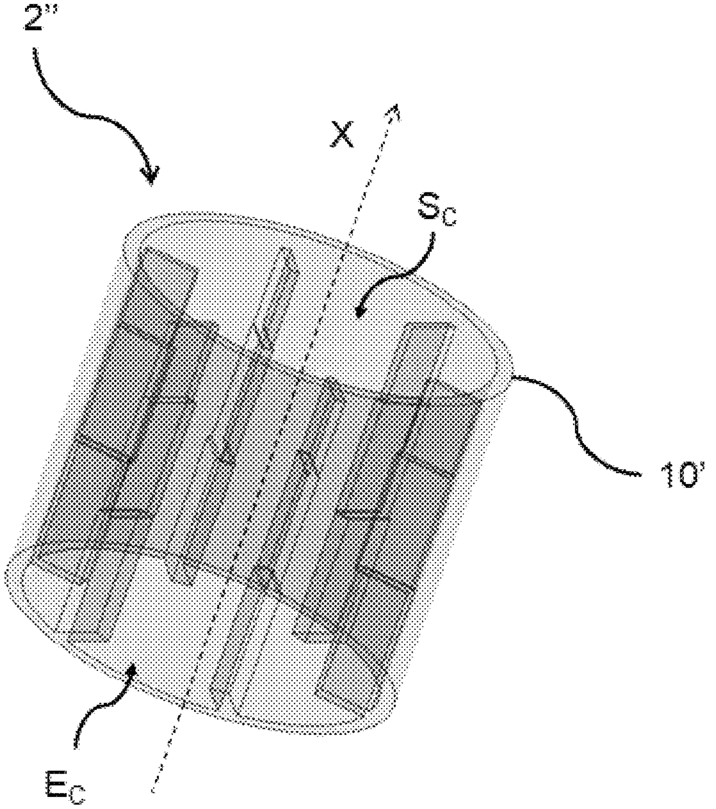
FIGS. 9A-9B represent in detail a circular horn according to a fourth variant of the invention.
Figure 9B:
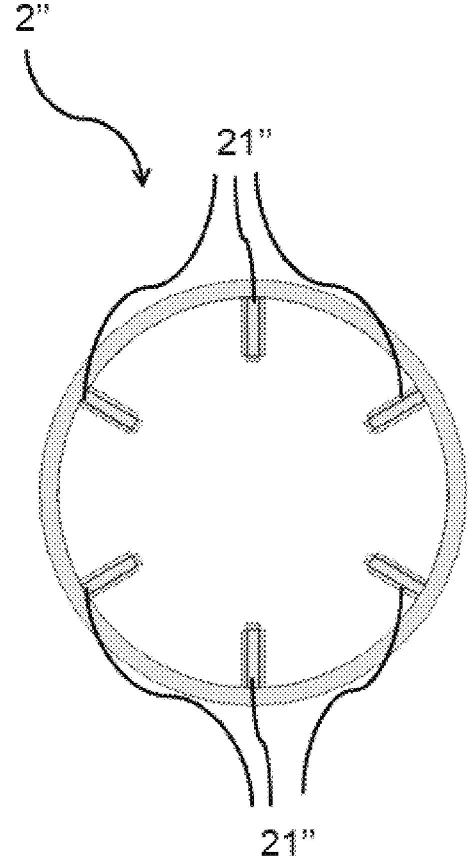

FIGS. 9A (3D view) and 9B (side view) represent a horn 2" according to a fourth variant of the invention, which differs from the first variant, from the second variant and from the third variant in that the straight cylinder 10' is circular and not hexagonal. The first ridges 21" are positioned regularly around the circle. In the example represented, there are six first ridges 21" each with three treads. However, the number of ridges and of treads is not limiting. Preferably, there is an even number of first ridges, both at the input and at the output of the horn.

Figure 10A:
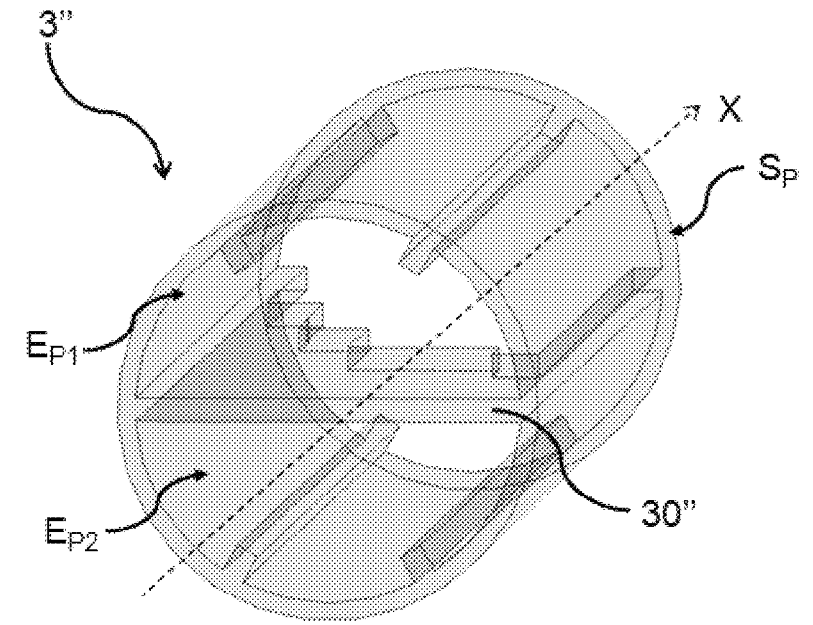
FIGS. 10A-10C represent in detail a circular polarizer according to the fourth variant of the invention.
Figure 10B:
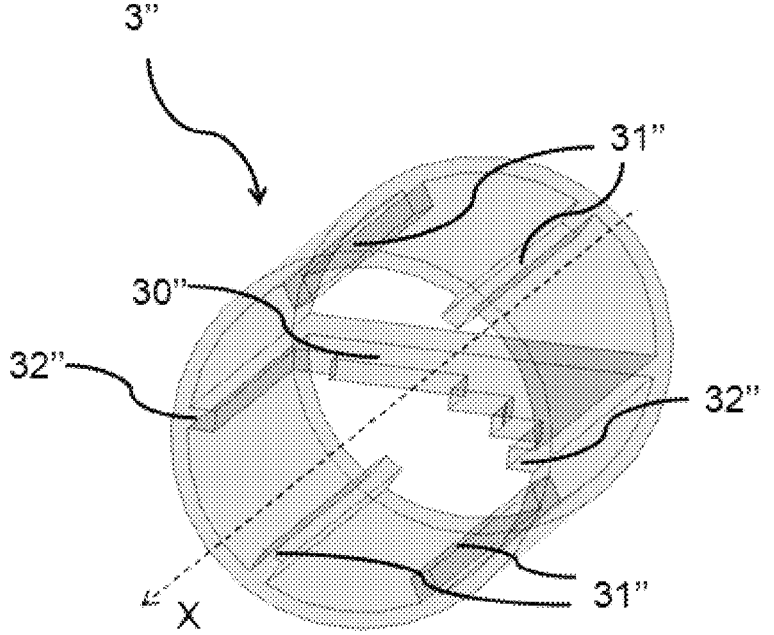
Figure 10C:
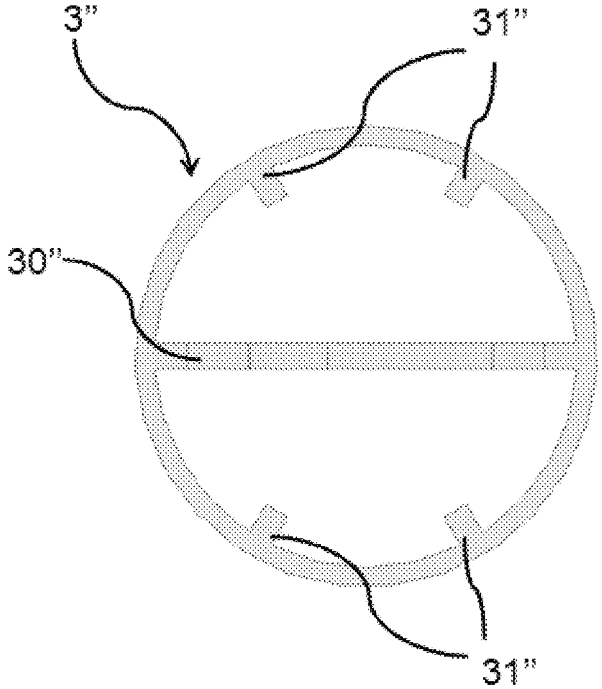

FIGS. 10A (3D view in the input-output direction of the polarizer), 10B (3D view in the output-input direction of the polarizer) and 10C (side view) represent a polarizer 3" according to the fourth variant of the invention, which differs from the first variant, from the second variant and from the third variant in that the straight cylinder 10' is circular and not hexagonal. The second ridges 31", 32" and the internal leaf 30" are positioned regularly around the perimeter of the circle. In the example represented, there are four second ridges 31" at the input of the polarizer and six second ridges 31", 32" at the polarizer output. However, the number of ridges is not limiting, preferably there is an even number of second ridges, both at the input and at the output of the polarizer.

The form of the straight cylinder is not limited to the hexagonal or circular form. Alternatively, the form of the straight cylinder can be square, octagonal, decagonal, and, more generally, in the form of a regular polygon of even order (even number of sides), in order to have the most symmetrical possible form.

Furthermore, in order to conserve the circular polarization, the ridges must be positioned symmetrically around the perimeter of the cylinder.

Thus, preferably for a cylinder with polygonal base, the number of first ridges in the horn is equal to the number of sides of the polygon, or to a multiple of the number of sides. For example:

- for a square cylinder, the number of first ridges can be 4, 8, 12, etc.;
- for a hexagonal cylinder, the number of first ridges can be 6, 12, etc.;
- for an octagonal cylinder, the number of first ridges can be 8, 16, etc.;
- for a decagonal cylinder, the number of first ridges can be 10, 20, etc.

The number of first ridges indicated above is given for the input and the output of the horn. For the polarizer, the number of second ridges indicated above corresponds to the number of ridges at the output thereof (at the polarizer input, there are at least two of them corresponding to the leaf). Likewise, when there is a filter, there are at least two third ridges corresponding to the leaf which are prolonged in the filter. Thus, for a hexagonal cylinder, there are preferably 6 first ridges at the input and at the output of the horn, 6 second ridges at the output of the polarizer (corresponding to the input horn), 4 second ridges at the input of the polarizer, and 4 third ridges at the input and at the output of the filter, if necessary.

The ridges (and the internal leaf) can be positioned at the internal vertices and/or on the internal lateral surfaces of the polygon, preferably in the middle of the internal lateral surfaces of the polygon.

For a circular cylinder, the ridges (and the internal leaf) are also regularly distributed around the perimeter of the circle, inside said circular cylinder. The number of first ridges, of second ridges, or even of third ridges when there is a filter, can be 4, 6, 8, 10, etc.

For a circular cylinder, there are preferably 6 first ridges at the input and at the output of the horn, 6 second ridges at the output of the polarizer (corresponding to the input of the horn), 4 second ridges at the input of the polarizer, and 4 third ridges at the input and at the output of the filter, if necessary.

More generally, the number of first ridges, and of second ridges, or even of third ridges when there is a filter, is preferably an even number, preferably at the input and at the output of the horn, of the polarizer and of the filter if necessary.

Since the horn and the polarizer are made of a single piece (waveguide), with the same outer form, the form of the horn conditions the form of the polarizer. Thus, if the horn is hexagonal, square, circular, the polarizer is too. Likewise, when a filter is added, the outer form of the third portion which comprises the filter complies with the outer form of the horn and of the polarizer.

Figure 13:
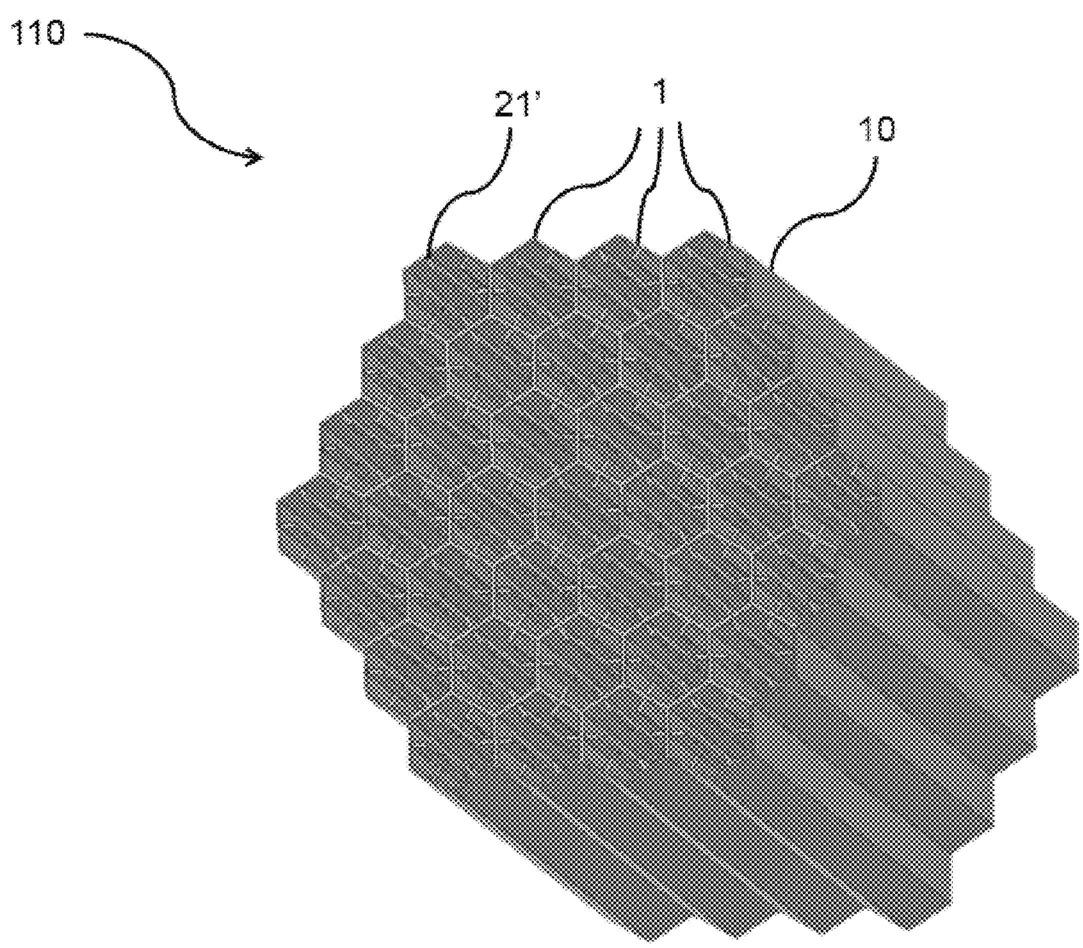
FIG. 13 represents by 3D view a radiating panel for a direct radiating array antenna comprising a plurality of feeds according to the invention.

FIG. 13 represents a 3D view (seen from the output of the horns) of a radiating panel 110 for an array antenna, comprising a plurality of feeds according to the invention. In the example represented, the feeds 1 all have a hexagonal straight cylinder form 10, the first ridges 21' being in the middle of the lateral surfaces of said cylinder. The radiating panel represented is made of a single piece. The number of feeds represented is, here, 37, but that is not limiting and that number is generally much higher. Furthermore, the feeds can be chosen according to any one of the embodiments, variants, alternatives described previously.

Preferably, the feeds of one and the same radiating panel are all substantially identical.

Since the structure of the radiating panel is complex, and the feeds have small dimensions (of the order of 10 cm high, 15 cm wide and 20 cm long), a preferred solution for manufacturing the radiating panel is additive manufacturing.

An additive manufacturing technique that is particularly suited to manufacturing the radiating panel is the selective laser melting technique, known as SLM, also called "LBM" (for "laser beam melting"). The SLM technique consists in depositing a layer of metallic powder of controlled thickness (generally in a controlled atmosphere) on a manufacturing plate, using a laser source to produce a selective melting of the powder in the manufacturing plane, then depositing another layer of powder on the preceding layer, the manufacturing iteration continuing so as to form the desired part. A titanium or aluminium metal powder can be used, although that is not limiting.

The SLM technique allows complex parts to be manufactured, and at the same time by reducing the manufacturing time and costs. Such a radiating panel with a plurality of feeds cannot be produced with certain conventional manufacturing methods (of milling, and other such types) or involves a complex and lengthy manufacturing process and at high manufacturing costs with other conventional manufacturing methods (of electroerosion and other such types).

As an alternative to the SLM technique, it is possible to envisage an additive manufacturing technique based on the use of polymers, for example the material extrusion additive manufacturing technique (also called "fused deposition modelling" or "FDM") according to which at least one heated printing head extrudes a polymer matrix filament so as to manufacture a part; the displacement of the printing head on the three axes makes it possible to deposit small volumes of molten polymer locally, and construct a part layer by layer. Material jetting additive manufacturing can also be cited, which is a method in which at least one printing head that can move on the three axes projects a photosensitive polymer, which acts as an ink, which is then polymerized by a UV radiation. Other techniques exist which are not cited here but which are well known to the person skilled in the art. Whatever the additive manufacturing technique based on the use of polymers may be, the part produced must be metallized (deposition of a metallization layer).

Even with the SLM technique, and in order to reduce the RF losses, a metallization layer is preferably produced on the part.

The metallization layer can be produced using an electrolytic deposition or a chemical deposition, for example depending on the form of the part and/or the targeted area of use.

In order to facilitate the additive manufacturing of a radiating panel, it is possible to adapt the production of certain elements of the feeds.

Figure 14A:
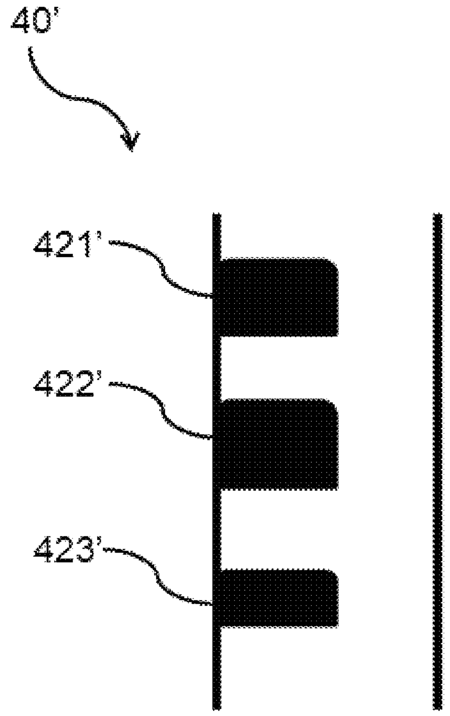
FIGS. 14A-14B illustrate a particular embodiment of a filter of a feed according to the invention.
Figure 14B:
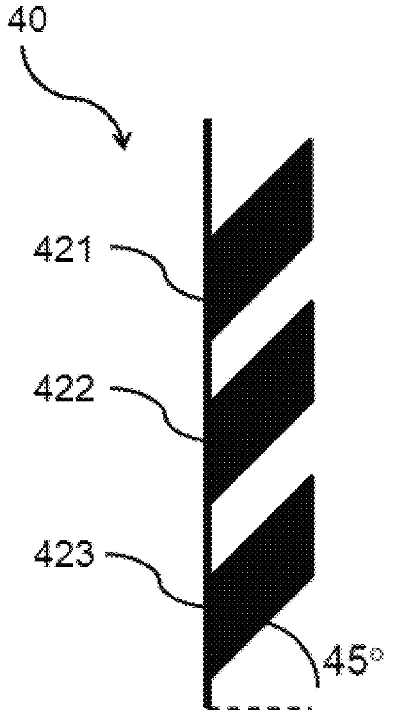

Thus, the posts 421, 422, 423 of the filters 4 can have an inclination (maximum inclination of 45°), as illustrated in FIGS. 14A (filter 4' comprising posts 421', 422', 423' without inclination) and 14B (filter 4 with inclination).

Figure 15A:
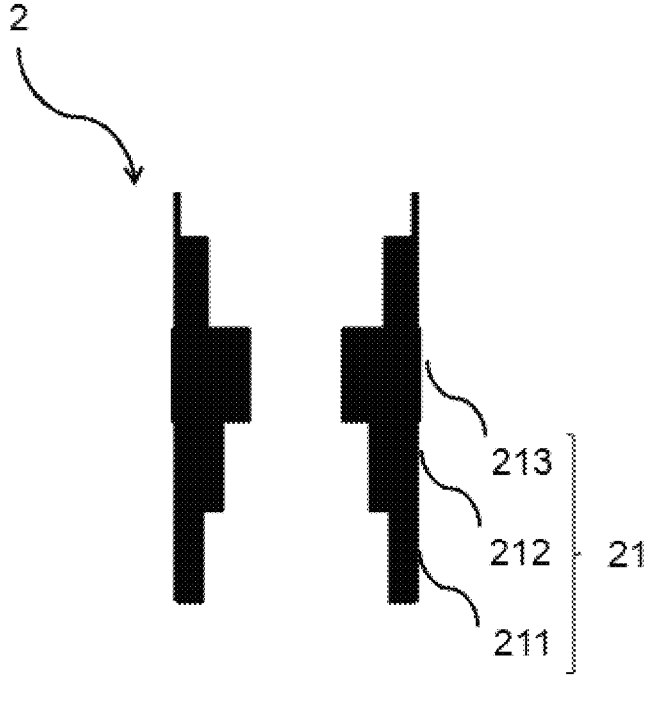
FIGS. 15A-15B illustrate a particular embodiment of a radiating element according to the invention.
Figure 15B:
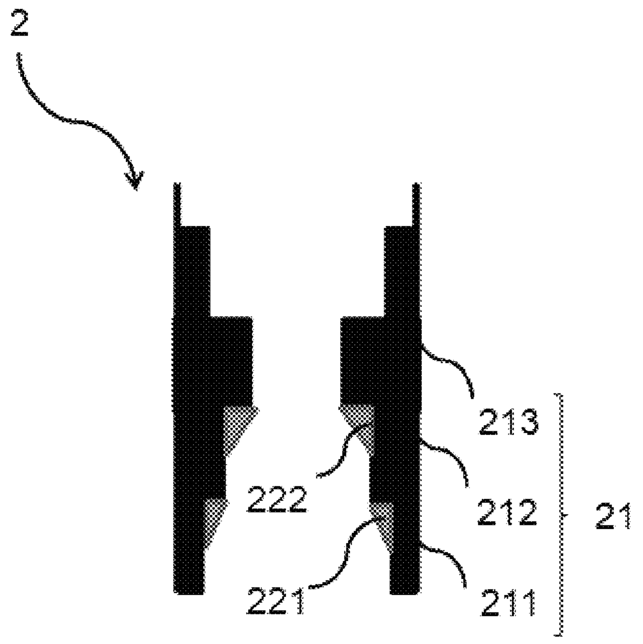

Furthermore, under all or part of the treads 211, 212, 213 of the horns 2, provision can be made to add material to produce a support 221, 222 as illustrated in FIGS. 15A (without support) and 15B (with support). Such a support for such a part which is vertically manufactured makes it possible to avoid collapse during manufacturing. Such a support is a technique commonly used in additive manufacturing.

As an alternative to an additive manufacturing technique, one solution for manufacturing a radiating panel is the pressurized moulding, or "diecasting" technique. The diecasting technique is a diecasting method which is characterized by the fact that molten metal is forced under high pressure into a mould cavity. The cavity of the mould is created using two dies made of tempered steel which have been machined into form and operate in a way similar to an injection mould during the process. Most of the diecast parts are manufactured from non-ferrous metals, in particular zinc, copper, aluminium, magnesium, lead, tin and the alloys based on tin. Depending on the type of metal cast, a hot or cold chamber machine is used.

Figure 16:
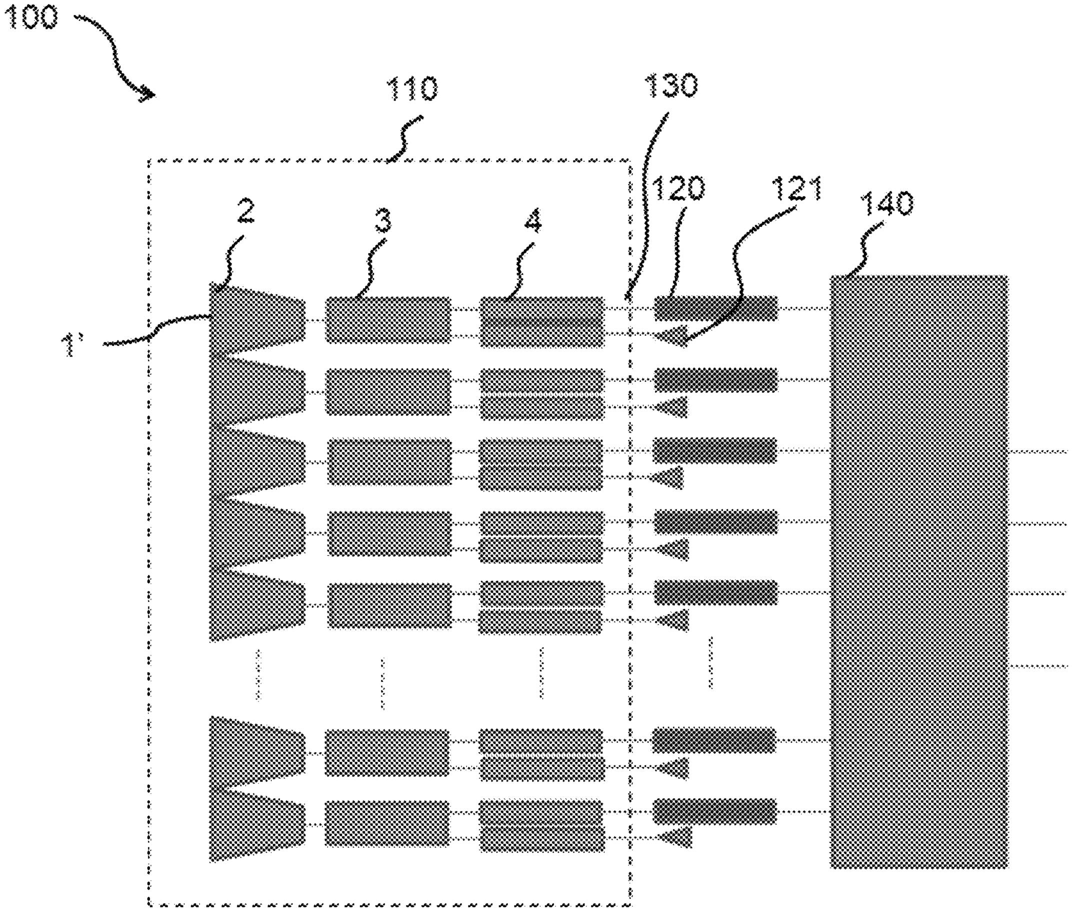
FIG. 16 schematically represents a functional architecture of a direct radiating array antenna.

FIG. 16 schematically represents a functional architecture of a direct radiating array antenna 100 which comprises a radiating panel 110 comprising several feeds 1' (each feed 1' is represented with a horn 2, a polarizer 3 and a filter 4), such as the radiating panel illustrated in FIG. 13. The radiating panel 110 is connected to amplifiers 120 and/or loads 121. The assembly is linked to a beam-forming network 140, or "BFN", which makes it possible to distribute the energy (in amplitude and in phase) between the different feeds to direct the beam from the antenna in a given direction.

A load makes it possible to absorb the RF energy that it receives and that it dissipates in the form of heat.

The electrically conductive connections 130 are produced between all or part of the feeds of the radiating panel and the amplifiers and/or the loads. With the metal (or metallization) thickness of the feeds of the radiating panel being small (generally a millimetre or less), it is difficult to produce these connections in said thickness, so placements in the array of feeds are used. In the case of a limited number of feeds (typically fifty or so feeds), the connections can be disposed on the edges of the array. If the number of feeds is greater, the connections will be disposed rather within the array.

Figure 17:
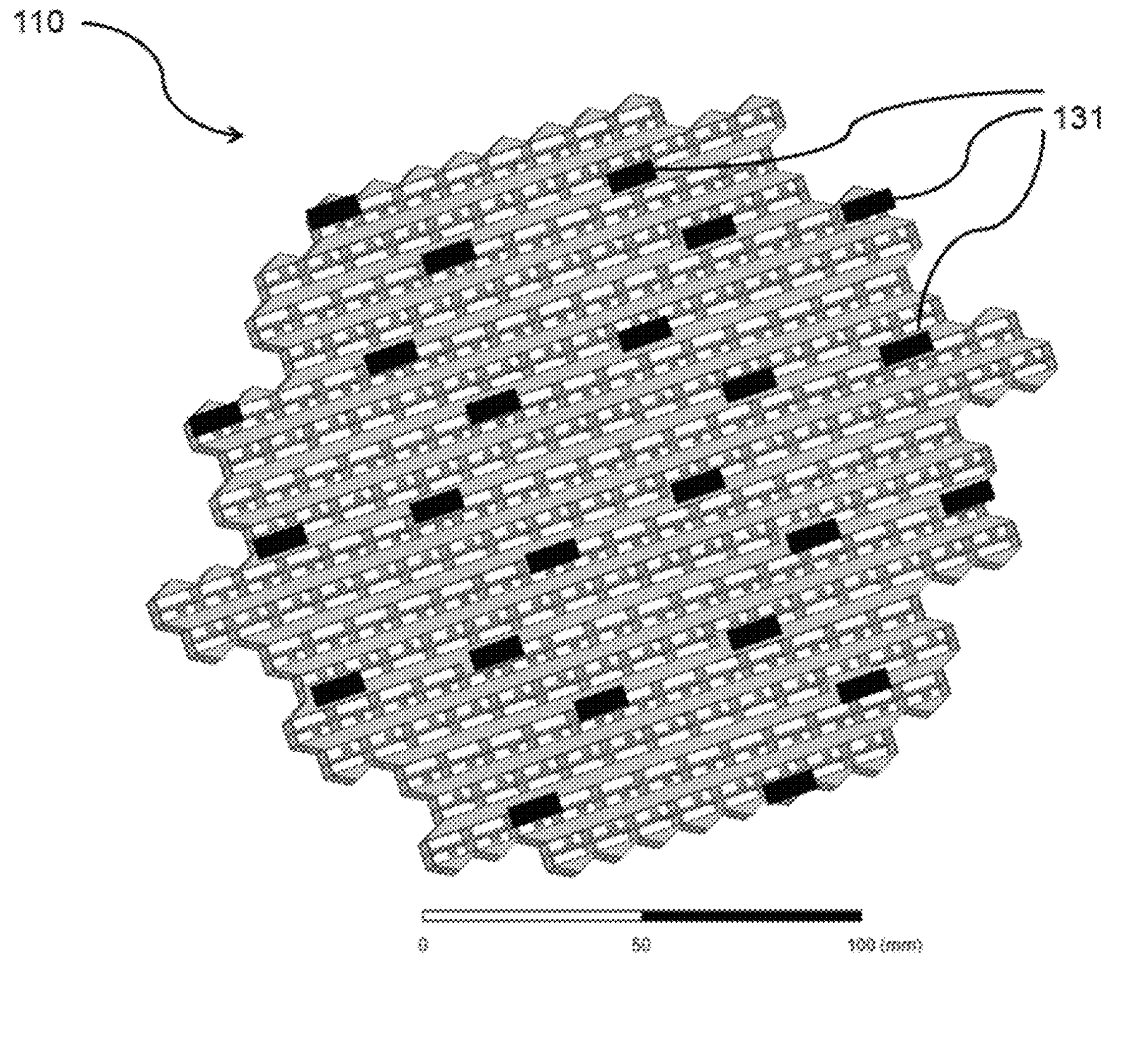
FIG. 17 illustrates a first mode of connection between a radiating panel and amplifiers and/or loads.
Figure 18:
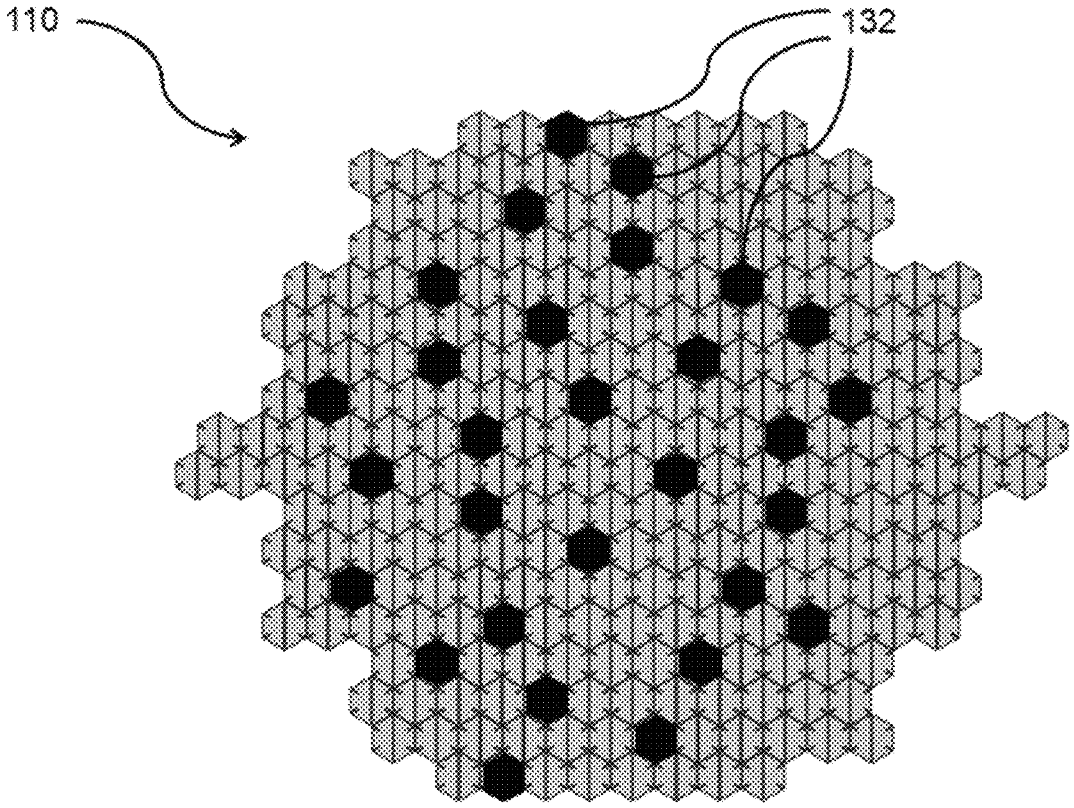
FIG. 18 illustrates a second mode of connection between a radiating panel and amplifiers and/or loads.

FIGS. 17 and 18 illustrate a radiating panel 110, such as the radiating panel illustrated in FIG. 13 (with more feeds), seen from the filter input.

The radiating panel illustrated comprises 256 radiating elements. There are consequently 512 ports at the input of the septum polarizers. For example, the port $E_{P1}$ (see reference for example in FIG. 4A) of the septum polarizer generates left circular polarization (LCP) and the port $E_{P2}$ (see reference for example in FIG. 4A) of the septum polarizer generates right circular polarization (RCP): thus, 256 ports at the input of the radiating panel generate right circular polarization and 256 ports generate left circular polarization. The antenna is generally designed to operate in single-polarization mode and, for the case presented in this example, in right polarization mode. In the case considered, the right polarization is called "main polarization" and the left polarization is called "cross polarization". In the case considered, the 256 ports $E_{P2}$ are followed by filters then they have to be connected to the amplifiers to generate the signal. The 256 ports $E_{P1}$ are not followed by filters and have to be connected to loads to limit the cross component which corresponds to noise.

To connect the amplifiers to the radiating panel, it is necessary to have locations with tappings in the radiating panel. For that, two solutions have been considered, of which FIG. 17 illustrates a first solution (connection 131), the second solution being illustrated in FIG. 18 (connection 132).

The first mode of connection 131 illustrated in FIG. 17 uses a few ports of the cross polarization (port $E_{P1}$ of the polarizers in the case considered) which are filled with material to be able to have a tapping in order to connect the amplifiers to the radiating panels with screws.

The second mode of connection 132 illustrated in FIG. 18 uses the 2 ports of the same feed (ports $E_{P1}$ and $E_{P2}$ of the polarizers in the case considered) which are filled with material to be able to have a tapping in order to connect the amplifiers to the radiating panels with screws.

In both modes, the connections form short-circuits.

In the case where the antenna is designed to operate in left polarization mode, then the 256 ports $E_{P1}$ are followed by filters then connected to the amplifiers and the 256 ports $E_{P2}$ are not followed by filters and are connected to loads.

Whatever the mode of connection used, the amplifiers are preferably grouped together in one or more blocks of several amplifiers, blocks that can be designated as "amplification modules". The link from the amplification modules to the radiating panel is made therefore via fixings which are fixed at the connections that are made, for example by screws which are screwed into the tappings of the connections. The connections can be made at the time of manufacturing of the radiating panel (for example during additive manufacturing) or after manufacturing (for example by tapping once the radiating panel has been manufactured).

The first mode of connection makes it possible not to excessively degrade the RF performance levels compared to the second mode of connection but demands more compact amplification modules. The second mode of connection is easier to produce.

The number of amplifiers in an amplification module (and consequently the number of short-circuits at the radiating panel output) depends on several parameters and objectives: the aim can be to facilitate the production of the assembly of the antenna in order to reduce the cost of the antenna, or to target RF performance levels for the antenna (the greater the number of short-circuits, the more the RF performance levels are degraded), or even to incorporate a thermal control (the aim of thermal control being to evacuate the power dissipated by the amplifiers out of the antenna).

The modes of transmission of the microwaves in the amplifiers and in the radiating panel are different. In fact, the waves at the output of the radiating panel are transmitted via a waveguide (ridged) whereas the waves in the amplifier are propagated generally using a line called "microstrip line" which is a microwave transmission line known to the person skilled in the art and will not be developed here.

Figure 19A:
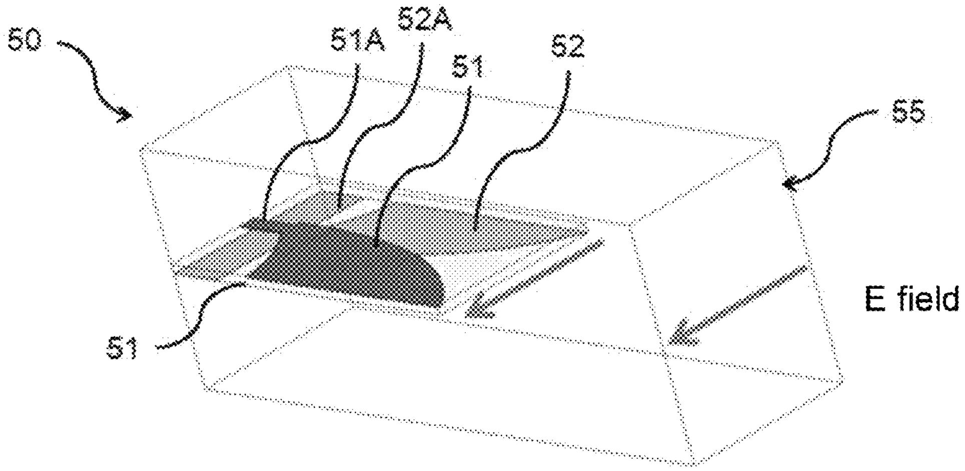
FIGS. 19A-19B are schematic diagrams of a Vivaldi transition.
Figure 19B:
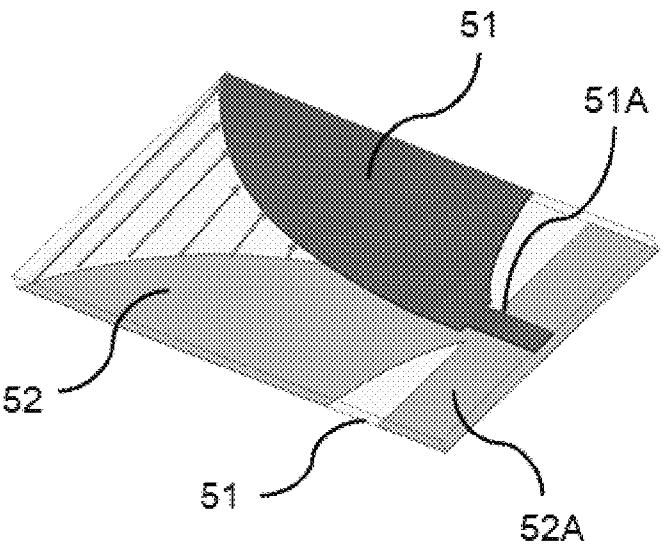

The transition of the mode of propagation of the HF waves in the ridged waveguide from the radiating panel to the microstrip line of the amplifiers must be produced via a suitable transition. The so-called "Vivaldi" antipodal transition makes it possible to produce a transition between a waveguide and a microstrip line, but it is generally implemented for a conventional and non-ridged waveguide. Its principle is illustrated in FIGS. 19A and 19B.

A so-called "Vivaldi" antipodal transition 50 consists in the insertion of a substrate 51 inside the waveguide 55 (generally in the middle of the waveguide). On the substrate, two different metal etchings are formed, a first etching 51 on its top face (its end furthest away from the input of the waveguide is refined in conductor strip form 51A) and a second etching 52 on its bottom face (its end furthest away from the input of the waveguide is widened to become the ground plane 52A). The electrical field E arrives at the etched substrate which picks up the electrical field, then contained between the two metal etchings. The form of the metal etchings makes it possible to rotate the electrical field, and transmit it to the conductive strip.

Figure 20A:
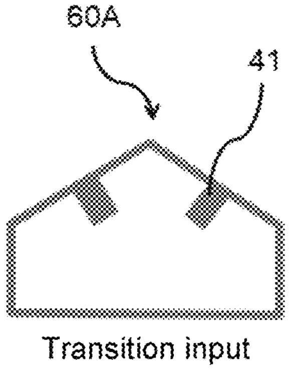
FIGS. 20A-20C illustrate an adaptation/transition of the waveguide of a feed according to the invention that makes it possible to incorporate a Vivaldi transition to amplifiers and/or loads.
Figure 20B:
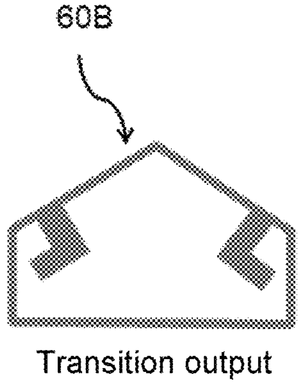
Figure 20C:
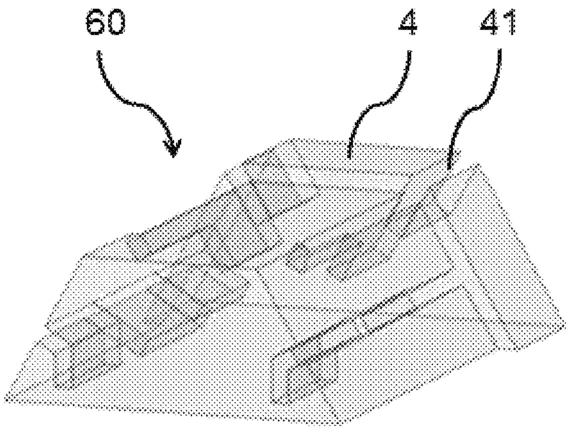

The inventors have developed a new transition based on the Vivaldi antipodal transition. The principle is to produce a transition piece beforehand that makes it possible to change the position, the dimensions and/or the forms of the ridges of the waveguide at the input of the feed (at the polarizer or filter input) to free up space at the centre thereof. An example of prior production of such a transition 60 is illustrated in FIGS. 20A, 20B and 20C. FIG. 20A represents a side view of the output 60A of the transition (for example at the filter input) where the ridges 41 of the filter 4 appear. FIG. 20B represents, by a side view, the input 60B of the transition/adaptation (amplifier side). FIG. 20C represents, by a 3D view, the transition/adaptation 60 in the continuity of the filter.

Figure 21:
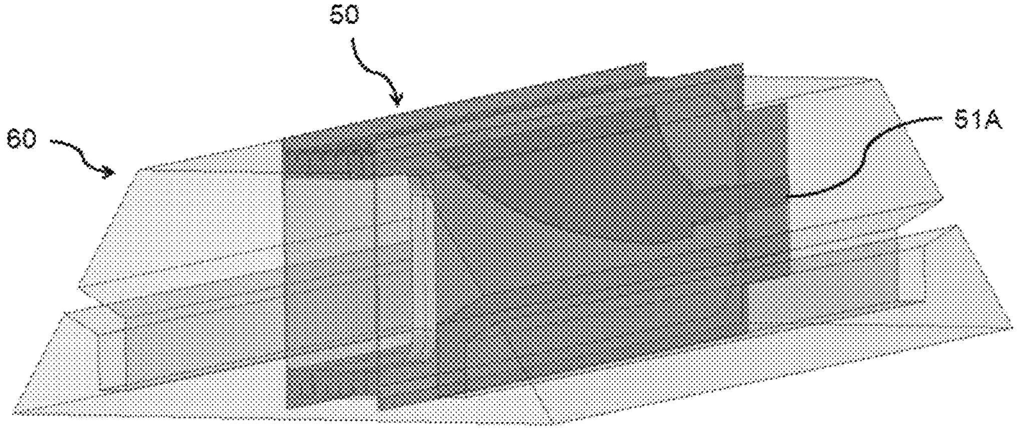
FIG. 21 illustrates a waveguide of a feed according to the invention incorporating a Vivaldi transition to amplifiers and/or loads.

This makes it possible to arrange the substrate of the Vivaldi transition 50 at the centre of the waveguide, with the two metal etchings, as illustrated in FIG. 21.

The loads can be connected in the same way to the radiating panels. The loads are in fact generally incorporated in the amplification module and can be connected in the same way as the amplifiers to the radiating panel, with the same transition/adaptation in the guide and the same Vivaldi transition. The load can be connected to the end of the microstrip line as surface-mounted component (SMC).

That thus makes it possible to form the array antenna, with the RF performance levels targeted.

Unless stipulated otherwise or technically impossible, the different embodiments, variants and alternatives can be combined. The antenna feed, the radiating panel and the array antenna can thus comprise one or more of the features previously described taken alone or in all possible technical combinations.

Furthermore, the present invention is not limited to the embodiments previously described but extends to any embodiment falling within the scope of the claims.

The invention is applicable in the field of space array antennas for satellites in low Earth orbit where data has to be transmitted within a wide angular range, notably in the K, Ka, Ku, Q, V, and other bands, for example for high-speed Internet.

The invention claimed is:

1. An antenna feed for a direct radiating array antenna, for the transmission and the reception of microwaves, said feed comprising a waveguide having at least one main part in hollow straight cylinder form extending in a longitudinal direction, a base of said hollow straight cylinder having at least one axis of symmetry in its plane and the outer transverse dimensions of said main part being constant in the longitudinal direction;

the main part of the waveguide comprising, in said longitudinal direction:

a first portion forming a radiating element, or the major part of said radiating element, said radiating element comprising first ridges extending inwards and over all or part of the length of said radiating element, said first ridges being regularly distributed around the perimeter of said radiating element and each having several treads along the longitudinal direction, the number, the heights and the thicknesses of said treads being configured to allow a given variation, preferably an increase, of impedance between an input and an output of the radiating element;

a second portion forming a polarizer, said polarizer comprising two inputs separated by an internal leaf extending in the longitudinal direction, and an output corresponding to the input of the radiating element, the internal leaf comprising several levels along the longitudinal direction, said levels being configured to transform a circularly polarized electromagnetic field at the input into a linearly polarized electromagnetic field at the output, and, in reverse, to transform a linearly polarized electromagnetic field at the output into a circularly polarized electromagnetic field at the input, the polarizer further comprising second ridges extending inwards and over all or part of the length of said polarizer, said second ridges and said internal leaf being regularly distributed around the perimeter of said polarizer;

a third portion comprising a filter, the internal leaf being prolonged in all or part of said third portion, the filter comprising a set of frequency filtration posts disposed inside the third portion and on one and the same surface of the internal leaf, the output of the filter corresponding to one of the two inputs of the polarizer, said third portion further comprising third ridges extending inwards and over all or part of the length of said third portion, said third ridges and the internal leaf being regularly distributed around the perimeter of said third portion;

the radiating element, the polarizer and the filter being made of a single piece, preferably produced by an additive manufacturing technique, and the polarizer and the filter being disposed end-to-end in the longitudinal direction.

2. The antenna feed according to claim 1, the waveguide having a constant thickness over all of its length.

3. The antenna feed according to claim 1, a number of said first ridges extending inwards and over all or part of the length of said radiating element and/or of said second ridges extending inwards and over all or part of the length of said polarizer being an even number, preferably both at the input and at the output of the radiating element and/or of the polarizer.

4. The antenna feed according to claim 1, the base of the hollow straight cylinder being a regular polygon of even order, preferably a hexagon.

5. The antenna feed according to claim 4, the internal leaf and all or part of the first ridges and/or of the second ridges being disposed at the vertices of the polygonal straight cylinder.

6. The antenna feed according to claim 4, the internal leaf and all or part of the first ridges and/or of the second ridges being disposed on the internal lateral surfaces of the polygonal straight cylinder.

7. The antenna feed according to claim 1, the base of the straight cylinder being a circle.

8. The antenna feed according to claim 1, a number of said third ridges extending inwards and over all or part of the length of said third portion being an even number, preferably both at the input and at the output of the filter.

9. The antenna feed according to claim 1, the waveguide being entirely in said hollow straight cylinder form over all of its length.

10. The antenna feed according to claim 1, the waveguide comprising the main part in said hollow straight cylinder form and a complementary part, said complementary part being able to be in cone or truncated pyramid form at the output of the radiating element, the most flared part being disposed at the output of the radiating element, the complementary part being free of grooves.

11. A radiating panel for a direct radiating array antenna comprising:

a plurality of antenna feeds chosen according to claim 1;

said radiating panel being made of a single piece, preferably produced by an additive manufacturing technique.

12. A direct radiating array antenna comprising:

a radiating panel for a direct radiating array antenna comprising a plurality of antenna feeds chosen according to claim 1; said radiating panel being made of a single piece, preferably produced by an additive manufacturing technique; and at least one amplifier and/or one load connected to the radiating panel, at the input of at least one of each said filter of one of said plurality of antenna feeds.

13. The array antenna according to claim 12, the radiating panel being connected to the at least one amplifier and/or the at least one load via at least one Vivaldi antipodal transition, and preferably via at least one transition/adaptation designed to change the position, the dimensions and/or the form of said second ridges or said third ridges of the waveguide at the input of the feed so as to be able to position the Vivaldi transition in said waveguide.

* * * * *